US009487716B2

(12) United States Patent
Morgenthaler et al.

(10) Patent No.: US 9,487,716 B2
(45) Date of Patent: Nov. 8, 2016

(54) SOURCING PHOSPHORUS AND OTHER NUTRIENTS FROM THE OCEAN VIA OCEAN THERMAL ENERGY CONVERSION SYSTEMS

(75) Inventors: Gaye Elizabeth Morgenthaler, Woodside, CA (US); David Vancott Jones, Woodside, CA (US)

(73) Assignee: LiveFuels, Inc., Menlo Park, CA (US)

( * ) Notice: Subject to any disclaimer, the term of this patent is extended or adjusted under 35 U.S.C. 154(b) by 640 days.

(21) Appl. No.: 13/463,623

(22) Filed: May 3, 2012

(65) Prior Publication Data
US 2012/0283458 A1 Nov. 8, 2012

Related U.S. Application Data

(60) Provisional application No. 61/483,376, filed on May 6, 2011.

(51) Int. Cl.
*A01K 61/02* (2006.01)
*C10L 1/02* (2006.01)
*C11C 3/00* (2006.01)
*C11B 1/10* (2006.01)
*A01K 61/00* (2006.01)

(52) U.S. Cl.
CPC ............... *C10L 1/02* (2013.01); *A01K 61/007* (2013.01); *A01K 61/02* (2013.01); *A23K 10/30* (2016.05); *A23K 50/80* (2016.05); *C10L 1/026* (2013.01); *C11B 1/10* (2013.01); *C11C 3/00* (2013.01); *C11C 3/003* (2013.01); *C10L 2200/0469* (2013.01); *C10L 2200/0476* (2013.01); *C10L 2200/0484* (2013.01); *Y02E 50/13* (2013.01)

(58) Field of Classification Search
CPC ............. B01D 11/02; B01D 11/0207; B01D 11/0288; C02F 1/26; C02F 2013/22; C02F 2103/36; A23K 1/14; A23K 1/288; A23K 10/16; A23K 10/18; A23K 10/20; A23K 10/22; A23K 50/80; A23K 10/30; C10L 1/02; C10L 1/10; C10L 1/026; C10L 1/1802; C10L 8/00; C10L 5/42; C10L 2200/0476; C10L 2200/0484; C10L 2200/0469; Y02E 50/10; Y02E 50/13; Y02E 10/34; C11C 3/00; C11C 3/02; C11C 3/003; C11B 1/04; C11B 1/10; C11B 1/12; C11B 3/00; C11B 3/001; C11B 3/006; C11B 3/02; C11B 3/04; C11B 11/02; C11B 11/0203; A01K 61/00; A01K 61/007; A01K 61/008; A01K 61/02; A01K 63/00
USPC ....... 44/307, 385, 605; 47/1.4, 60, 62, 62 R, 47/62 A; 554/8, 174, 175; 119/213, 215, 119/226; 210/67.21, 170.02, 170.11, 257.1, 210/511, 634
See application file for complete search history.

(56) References Cited

U.S. PATENT DOCUMENTS

| | | | |
|---|---|---|---|
| 972,175 A | 10/1910 | Evans | |
| 2,637,978 A | 5/1953 | Evans et al. | |
| 2,653,451 A | 9/1953 | McCullough | |
| 2,927,435 A | 3/1960 | Upson | |
| 3,155,609 A | 11/1964 | Pampel | |
| 3,473,509 A | 10/1969 | Miyamura | |
| 3,499,421 A | 3/1970 | MacDonald et al. | |
| 3,683,627 A | 8/1972 | Girden | |
| 3,811,411 A | 5/1974 | Moeller | |
| 3,815,546 A | 6/1974 | Plante | |
| 4,044,720 A | 8/1977 | Fast | |
| 4,055,145 A | 10/1977 | Mager et al. | |
| 4,080,795 A | 3/1978 | Weidler, Jr. | |
| 4,137,869 A | 2/1979 | Kipping | |
| RE30,038 E | 6/1979 | Sweeney | |
| 4,189,379 A * | 2/1980 | Finley | 210/644 |
| 4,231,312 A | 11/1980 | Person | |
| 4,281,614 A | 8/1981 | McNary et al. | |
| 4,337,727 A | 7/1982 | Mickelsen et al. | |
| 4,368,691 A | 1/1983 | Brune | |
| 4,428,702 A | 1/1984 | Abbott et al. | |
| 4,543,190 A | 9/1985 | Modell | |
| 4,557,629 A | 12/1985 | Meek et al. | |
| 4,597,360 A | 7/1986 | Johnson | |

(Continued)

FOREIGN PATENT DOCUMENTS

DE 101 43 793 A1 5/2002
JP 05-244966 9/1993

(Continued)

OTHER PUBLICATIONS

Publication by Yanquin Li, "Articles: Biocatalysts and Bioreactor Design, Biofuels from Microalgae", Biotechnology Progress, 2008, vol. 24, pp. 815-820.*
Publication: "Aquatic Biomass: Sustainable Bioenergy from Algae?", Hennenberg et al, Pbulished by Institu fur angewandte Okologie Institute for Applied Ecology, Darmstadt, Germany, Nov. 2009.*
Japanese Office Action with English translation, in corresponding JP application No. 2011-527833, mailed Aug. 22, 2014, 8 pages total.
Allen, Recruitment, Distribution, and Feeding Habits of Young-of-the-Year California Halibut (Paralichthys californicus) in the Vicinity of Alamitos Bay-Long Beach Harbor, California 1983-1985 (1988) *Bull. Southern California Acad. Sci.* 87:19-30.

(Continued)

*Primary Examiner* — Joseph Drodge
(74) *Attorney, Agent, or Firm* — Squire Patton Boggs (US) LLP

(57) ABSTRACT

Provided herein are controlled methods for producing biofuel and lipids from algae. In certain embodiments, the controlled methods comprise: (i) providing upwelled water in a body of water; (ii) culturing algae in the upwelled water; (iii) feeding the algae to planktivorious organisms; (iv) extracting lipids from the planktivorious organisms; and (v) polishing the lipids to make biofuel or other useful products. In certain embodiments, the upwelled water is provided in the body of water by using an open-cycle OTEC system. Also provided herein are controlled systems for producing biofuel and lipids from algae.

28 Claims, No Drawings

(56) References Cited

U.S. PATENT DOCUMENTS

| | | |
|---|---|---|
| 4,599,014 A | 7/1986 | McGillivray et al. |
| 4,687,380 A | 8/1987 | Meek et al. |
| 4,696,603 A | 9/1987 | Danaczko et al. |
| 4,699,086 A | 10/1987 | Mori |
| 4,724,086 A | 2/1988 | Kortmann |
| 4,810,135 A | 3/1989 | Davenport et al. |
| 4,818,145 A | 4/1989 | Carruba |
| 4,896,626 A | 1/1990 | Holt et al. |
| 4,979,871 A | 12/1990 | Reiner |
| 5,040,486 A | 8/1991 | Pack |
| 5,106,230 A | 4/1992 | Finley |
| 5,254,252 A | 10/1993 | Drenner |
| 5,267,812 A | 12/1993 | Suzuki et al. |
| 5,299,530 A | 4/1994 | Mukadam et al. |
| 5,338,673 A | 8/1994 | Thepenier et al. |
| 5,359,962 A | 11/1994 | Loverich |
| 5,377,624 A | 1/1995 | Craig et al. |
| 5,438,958 A | 8/1995 | Ericsson et al. |
| 5,439,060 A | 8/1995 | Huete et al. |
| 5,511,514 A | 4/1996 | Hitchins et al. |
| 5,535,701 A * | 7/1996 | Markels, Jr. ............... 119/231 |
| 5,539,133 A | 7/1996 | Kohn et al. |
| 5,545,808 A | 8/1996 | Hew et al. |
| 5,582,691 A | 12/1996 | Flynn et al. |
| 5,588,781 A | 12/1996 | Smolinski et al. |
| 5,596,947 A | 1/1997 | Creppel et al. |
| 5,628,279 A | 5/1997 | Bones, IV |
| 5,642,966 A | 7/1997 | Morrison et al. |
| 5,713,303 A | 2/1998 | Willinsky et al. |
| 5,778,823 A | 7/1998 | Adey et al. |
| 5,820,759 A | 10/1998 | Stewart et al. |
| 5,836,266 A | 11/1998 | Watanabe |
| 5,945,318 A | 8/1999 | Breivik et al. |
| 5,992,089 A | 11/1999 | Jones et al. |
| 5,998,698 A | 12/1999 | Cooper et al. |
| 6,000,551 A | 12/1999 | Kanel et al. |
| 6,015,713 A | 1/2000 | Wright, Jr. et al. |
| 6,027,286 A | 2/2000 | Pollack |
| 6,056,919 A | 5/2000 | Markels, Jr. |
| 6,065,245 A | 5/2000 | Seawright |
| 6,111,166 A | 8/2000 | Van de Winkel |
| 6,180,845 B1 | 1/2001 | Catallo et al. |
| 6,190,715 B1 | 2/2001 | Crowther et al. |
| 6,192,833 B1 | 2/2001 | Brune et al. |
| 6,216,635 B1 | 4/2001 | McRobert |
| 6,313,545 B1 | 11/2001 | Finley et al. |
| 6,350,890 B1 | 2/2002 | Kiy et al. |
| 6,391,201 B1 | 5/2002 | Pelz |
| 6,509,178 B1 | 1/2003 | Tanaka et al. |
| 6,514,747 B2 | 2/2003 | Woychik et al. |
| 6,555,219 B2 | 4/2003 | Kosinski |
| 6,607,900 B2 | 8/2003 | Bailey et al. |
| 6,615,767 B1 | 9/2003 | Untermeyer et al. |
| 6,667,171 B2 | 12/2003 | Bayless et al. |
| 6,750,048 B2 | 6/2004 | Ruecker et al. |
| 6,789,502 B2 | 9/2004 | Hjaltason et al. |
| 6,800,299 B1 | 10/2004 | Beaudoin et al. |
| 6,821,413 B1 | 11/2004 | Alkhalidl |
| 6,851,387 B2 * | 2/2005 | Untermeyer et al. ........ 119/212 |
| 6,863,027 B1 | 3/2005 | Silva |
| 6,863,028 B2 | 3/2005 | Sherman |
| 6,986,323 B2 | 1/2006 | Ayers |
| 7,029,586 B2 | 4/2006 | Austin et al. |
| 7,063,855 B2 | 6/2006 | Hjaltason et al. |
| 7,067,145 B2 | 6/2006 | Place et al. |
| 7,126,235 B2 | 10/2006 | Bernhoff et al. |
| 7,128,375 B2 | 10/2006 | Watson |
| 7,132,254 B2 | 11/2006 | Vincent |
| 7,258,790 B2 | 8/2007 | Brune et al. |
| 7,329,099 B2 | 2/2008 | Hartman |
| 7,347,667 B2 | 3/2008 | Wobben |
| 7,351,558 B2 | 4/2008 | Ruecker et al. |
| 7,416,671 B2 | 8/2008 | Bozak et al. |
| 7,431,623 B1 * | 10/2008 | Saucedo et al. ............ 441/133 |
| 7,459,597 B2 | 12/2008 | Koivusalmi et al. |
| 7,467,601 B2 | 12/2008 | Brauman |
| 7,473,285 B2 | 1/2009 | Russell et al. |
| 7,484,329 B2 | 2/2009 | Levy |
| 7,501,546 B2 | 3/2009 | Koivusalmi et al. |
| 7,507,554 B2 | 3/2009 | Bush et al. |
| 7,662,598 B2 | 2/2010 | Ruecker et al. |
| 7,678,171 B2 | 3/2010 | Beckley et al. |
| 7,678,931 B2 | 3/2010 | Fiehtali et al. |
| 7,687,261 B2 | 3/2010 | Hazlebeck et al. |
| 7,795,484 B2 | 9/2010 | Koivusalmi |
| 7,850,841 B2 | 12/2010 | Koivusalmi et al. |
| 7,887,694 B2 | 2/2011 | Constantz et al. |
| 7,888,542 B2 | 2/2011 | Koivusalmi et al. |
| 7,905,930 B2 | 3/2011 | Oyler |
| 7,977,076 B2 | 7/2011 | Oyler |
| 8,022,258 B2 | 9/2011 | Myllyoja et al. |
| 8,030,037 B2 | 10/2011 | Thomas et al. |
| 8,053,614 B2 | 11/2011 | Aalto et al. |
| 8,080,679 B2 | 12/2011 | Hatcher et al. |
| 8,088,614 B2 | 1/2012 | Vick et al. |
| 8,126,780 B2 | 2/2012 | Iwai et al. |
| 8,361,763 B2 | 1/2013 | Dayton et al. |
| 8,404,004 B2 | 3/2013 | Oyler |
| 8,753,851 B2 * | 6/2014 | Stephen et al. ............... 435/134 |
| 8,821,595 B2 | 9/2014 | Knottenbelt et al. |
| 2002/0072109 A1 | 6/2002 | Bayless et al. |
| 2002/0110582 A1 | 8/2002 | Place et al. |
| 2002/0151463 A1 | 10/2002 | Woychik et al. |
| 2003/0124218 A1 | 7/2003 | Hjaltason et al. |
| 2003/0154073 A1 | 8/2003 | Untermeyer et al. |
| 2003/0221361 A1 | 12/2003 | Russell et al. |
| 2004/0022584 A1 * | 2/2004 | Sherman ..................... 405/75 |
| 2004/0074760 A1 | 4/2004 | Portnoff et al. |
| 2004/0089592 A1 | 5/2004 | Shechter et al. |
| 2004/0107914 A1 | 6/2004 | Untermeyer et al. |
| 2004/0262980 A1 | 12/2004 | Watson |
| 2005/0115893 A1 | 6/2005 | Brune et al. |
| 2005/0164333 A1 | 7/2005 | Vincent |
| 2005/0170479 A1 | 8/2005 | Weaver et al. |
| 2005/0218071 A1 | 10/2005 | Austin et al. |
| 2005/0260553 A1 | 11/2005 | Berzin |
| 2006/0016760 A1 | 1/2006 | Bozak et al. |
| 2006/0169216 A1 | 8/2006 | Shields et al. |
| 2006/0229222 A1 | 10/2006 | Muller et al. |
| 2006/0254134 A1 | 11/2006 | Levy |
| 2007/0010682 A1 | 1/2007 | Myllyoja et al. |
| 2007/0033863 A1 | 2/2007 | Butler |
| 2007/0048848 A1 | 3/2007 | Sears |
| 2007/0082399 A1 | 4/2007 | Egorova-Zachernyuk |
| 2007/0092962 A1 | 4/2007 | Sheppard |
| 2007/0113467 A1 | 5/2007 | Abou-Nemeh |
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0135666 A1 | 6/2007 | Koivusalmi et al. |
| 2007/0135669 A1 | 6/2007 | Koivusalmi et al. |
| 2007/0151522 A1 | 7/2007 | Brauman |
| 2007/0166411 A1 | 7/2007 | Anthony et al. |
| 2007/0202582 A1 | 8/2007 | Bush et al. |
| 2007/0274952 A1 | 11/2007 | Kang |
| 2007/0281883 A1 | 12/2007 | Rosenfeld et al. |
| 2007/0298156 A1 | 12/2007 | Mehansho et al. |
| 2007/0299291 A1 | 12/2007 | Koivusalmi |
| 2008/0009055 A1 | 1/2008 | Lewnard |
| 2008/0020097 A1 | 1/2008 | Torp et al. |
| 2008/0092436 A1 | 4/2008 | Seames et al. |
| 2008/0138867 A1 | 6/2008 | Dayton et al. |
| 2008/0155888 A1 | 7/2008 | Vick et al. |
| 2008/0155890 A1 | 7/2008 | Oyler |
| 2008/0160593 A1 | 7/2008 | Oyler |
| 2008/0166779 A1 | 7/2008 | Thomas et al. |
| 2008/0175728 A1 * | 7/2008 | Kithil .......................... 417/331 |
| 2008/0188676 A1 | 8/2008 | Anderson et al. |
| 2008/0277492 A1 * | 11/2008 | Cannon ................... A01G 15/00 239/14.1 |
| 2008/0299643 A1 | 12/2008 | Howard et al. |
| 2008/0320610 A1 | 12/2008 | Yoshizaki et al. |
| 2009/0077863 A1 | 3/2009 | Oyler |
| 2009/0077864 A1 | 3/2009 | Marker et al. |

(56) References Cited

U.S. PATENT DOCUMENTS

| | | | |
|---|---|---|---|
| 2009/0081748 | A1 | 3/2009 | Oyler |
| 2009/0158638 | A1 | 6/2009 | Hatcher et al. |
| 2009/0209014 | A1* | 8/2009 | Chi et al. ............... 435/134 |
| 2010/0035321 | A1* | 2/2010 | Wilkerson et al. ...... 435/173.1 |
| 2010/0049673 | A1 | 2/2010 | Millen, II et al. |
| 2010/0050502 | A1 | 3/2010 | Wu et al. |
| 2010/0077654 | A1* | 4/2010 | Wu et al. ............... 44/385 |
| 2010/0081835 | A1* | 4/2010 | Wu et al. ............... 554/8 |
| 2010/0236137 | A1* | 9/2010 | Wu et al. ............... 44/385 |
| 2011/0010987 | A1 | 1/2011 | Knottenbelt et al. |
| 2011/0067641 | A1 | 3/2011 | Kithil |
| 2011/0239318 | A1 | 9/2011 | Stephen et al. |
| 2012/0058248 | A1 | 3/2012 | Stephen et al. |
| 2012/0058542 | A1* | 3/2012 | Wu ............... A01K 61/00 435/257.1 |
| 2012/0073290 | A1* | 3/2012 | Lau ............... 60/641.7 |
| 2012/0115210 | A1* | 5/2012 | Winters ............... C12M 21/02 435/257.1 |
| 2012/0137574 | A1 | 6/2012 | Stephen et al. |
| 2012/0184001 | A1 | 7/2012 | Stephen et al. |
| 2012/0231513 | A1 | 9/2012 | Stephen et al. |
| 2012/0277449 | A1 | 11/2012 | Morgenthaler |
| 2012/0283458 | A1 | 11/2012 | Morgenthaler et al. |
| 2012/0284165 | A1 | 11/2012 | Morgenthaler et al. |
| 2012/0285392 | A1 | 11/2012 | Morgenthaler et al. |
| 2013/0039833 | A1 | 2/2013 | Zullo |
| 2014/0220664 | A1 | 8/2014 | Stephen et al. |

FOREIGN PATENT DOCUMENTS

| | | |
|---|---|---|
| JP | 2004-236648 A | 8/2004 |
| JP | 3644842 | 5/2005 |
| JP | 2007-054027 A | 3/2007 |
| JP | 2007-209241 A | 8/2007 |
| JP | 2008-043252 A | 2/2008 |
| JP | 2008-212772 | 9/2008 |
| WO | WO 01/54510 A1 | 8/2001 |
| WO | WO 2004/068941 A1 | 8/2004 |
| WO | WO 2004/070165 A1 | 8/2004 |
| WO | WO 2004/082399 A2 | 9/2004 |
| WO | WO 2008/013548 A2 | 1/2008 |
| WO | WO 2008/105649 A1 | 9/2008 |

OTHER PUBLICATIONS

Barclay, Nutritional Enhancement of n-3 and n-6 Fatty Acids in Rotifers and *Artemia Nauplii* by Feeding Spray-dried *Schizochytrium* sp. (1996) *Journal of the World Aquaculture Society* 27:314-322.

Bjornsdottir et al., Survival and quality of halibut larvae (*Hippoglossus hippoglossus* L.) in intensive farming: Possible impact of the intestinal bacterial community (2009) *Aquaculture* 286:53-63.

Blaxter et al., Description of the Early Development of the Halibut *Hippoglossus hippoglossus* and Attempts to Rear the Larvae Past First Feeding (1983) *Marine Biology* 73:99-107.

Cargnelli et al., Essential Fish Habitat Source Document: Atlantic Halibut, *Hippoglossus hippoglossus*, Life History and Habitat Characteristics (1999) *NOAA Technical Memorandum* NMFS-NE-125, 26 pages.

Galli, Genetic Modification in Aquaculture—A review of potential benefits and risks (2002) Bureau of Rural Sciences, Canberra, Australia; 54 pages.

Gibson, Development, morphometry and particle retention capability of the gill rakers in the herring, *Clupea harengus* L. (1988) *J. Fish. Biol.* 32:949-962.

Harboe et al., Age of Atlantic Halibut Larvae (*Hippoglossus hippoglossus* L.) at First Feeding (1990) Institute of Marine Research, Austevoll Aquaculture Research Station, Norway, C.M. 1990/F:53, 7 pages.

Holmefjord et al., An Intensive Approach to Atlantic Halibut Fry Production (1993) *Journal of the World Aquaculture Society* 24:275-284.

Moffat, Survival and Growth of Northern Anchovy Larvae on Low Zooplankton Densities as Affected by the Presence of a *Chlorella* Bloom (1981) *Rapp. P.-v. Rèun. Cons. int. Explor. Mer* 178:475-480.

Muguet et al., Green Water Culture of California Halibut Larvae (2005) *Global Aquaculture Advocate*, pp. 88 and 90.

Pittman et al., Morphological and behavioural development of halibut, *Hippoglossus hippoglossus* (L.) larvae (1990) *Journal of Fish Biology* 37:455-472.

Popma et al., Tilapia Life History and Biology (Mar. 1999) Southern Regional Aquaculture Center Publication No. 283, 4 pages.

Reitan et al., Ingestion and assimilation of microalgae in yolk sac larvae of halibut, *Hippoglossus Hippoglossus* (L.) *LARVI '91—Fish & Crustacean Larviculture Symposium*, European Aquaculture Society, Special Publication No. 15, Gent, Belgium. 1991, 5 pages.

Simonsen et al., Feeding ecology of Greenland halibut and sandeel larvae off West Greenland (2006) *Marine Biology* 149:937-952.

Van Der Meeren et al., Algae as first food for cod larvae, *Gadus morhua* L.: filter feeding or ingestion by accident? (1991) *Journal of Fish Biology* 39:225-237.

Albers et al. Short Path Distillation in the Fish Oil Industry (2006) UIC GmbH.

Alpine et al., Trophic Interactions and Direct Physical Effects Control Phytoplankton Biomass and Production in an Estuary (1992) *Limnol. Oceanogr.* 37:946-955.

Arai, Genetic Improvement of Aquaculture Finfish Species by Chromosome Manipulation Techniques in Japan (2001) *Aquaculture* 197:205-228.

Armstrong, Grazing Limitation and Nutrient Limitation in Marine Ecosystems: Steady State Solutions of an Ecosystem Model with Multiple Food Chains (1994) *Limnol. Oceanogr.* 39(3):597-608.

Badylak et al., Spatial and temporal distributions of zooplankton in Tampa Bay, Florida, including observations during a HAB event (2008) *J. Plankton Res.* 30:449-465.

Barnabe, Harvesting Micro-Algae (1990) *Aquaculture* 1:207-212 Edition Ellis Horwood, New York.

Beardmore et al., Monosex Male Production in Finfish as Exemplified by Tilapia: Applications, Problems, and Prospects (2001) *Aquaculture* 197:283-301.

Becker, Large-Scale Cultivation (1994) *Microalgae Biotechnology and Microbiology* 10:63-171 Cambridge University Press.

Becker, Microalgae for Aquaculture: The Nutritional Value of Microalgae for Acquaculture (2004) *Handbook of Microalgal Culture: Biotechnology and Applied Phycology*, Richmond (ed). pp. 380-391 Wiley-Blackwell.

Belarbi et al., A process for high yield and scaleable recovery of high purity eicosapentaenoic acid esters from microalgae and fish oil (2000) *Enzyme and Microbial Technology* 26:516-529.

Benfield et al., RAPID: Research on Automated Plankton Identification (2007) *Oceanography* 20:172-187.

Berger et al., Increase of Carbon Dioxide in the Atmosphere During Deglaciation: The Coral Reef Hypothesis (1982) *Naturwissenschaften* 69:87-88.

Bligh et al., A Rapid Method of Total Lipid Extraction and Purification (1959) *Canadian J Biochem. Physiol.* 37:911-917.

Boucher et at., In situ Measurement of Respiratory Metabolism and Nitrogen Fluxes at the Interface of Oyster Beds (1988) *Mar. Ecol. Prog. Ser.* 44:229-238.

Bricker et al., Effects of Nutrient Enrichment in the Nation's Estuaries: A Decade of Change. *NOAA Coastal Ocean Program Decision Analysis Series* No. 26, National Centers for Coastal Ocean Science, Silver Spring, MD (328 pages); on the web at: http://ccma.nos.noaa.gov/publications/eutroupdate/.

Bridgwater, Biomass Fast Pyrolysis (2004) *Thermal Science* 8:21-49.

Browdy et al., Comparison of Pond Production Efficiency, Fatty Acid Profiles, and Contaminants in *Litopenaeus vannamei* Fed Organic Plant-based and Fish-meal-based Diets (2006) *J. World Aquaculture Soc.* 37:437-451.

Bruland et al., Iron and Macronutrients in California Coastal Upwelling Regimes: Implications for Diatom Blooms (2001) *Linmol. Oceanogr.* 46:1661-1674.

(56) References Cited

OTHER PUBLICATIONS

Brune et al., Improved process for harvest and concentration of algal lipid for biodiesel production, 29th Symposium on Biotechnology for Fuels and Chemicals, Apr. 29-May 2, 2007, Denver CO. Abstract 1 pg.

Brune et al., Intensification of Pond Aquaculture and High Rate Photosynthetic Systems (2003) *Aquaculture Eng'g* 28:65-86.

Cerda-Reverter et al., Endogenous Melanocortin Antagonist in Fish: Structure, Brain Mapping, and Regulation by Faster of the Goldfish Agouti-Related Protein Gene (2002) *Endocrinology* 144;4552-4581.

Chauvaud et al., Clams as $CO_2$ Generators: The *Potamocorbula amurensis* Example in San Francisco Bay (2003) *Limnol Oceanogr.* 48:2086-2092.

Chiaramonti et al., Power Generation Using Fast Pyrolysis Liquids from Biomass (2007) *Renewable and Sustainable Energy Reviews* 11:1056-1086.

Chisti, Biodiesel from microalgae (2007) *Biotechnology Advances* 25:294-306.

Cho, Feeding systems for rainbow trout and other salmonids with reference to current estimates of energy and protein requirements (1992) *Aquaculture* 100:107-123.

Christie, Preparation of Ester Derivatives of Fatty Acids for Chromatographic Analysis (1993) *Advances in Lipid Methodology*—vol. Two pp. 69-111.

Cloern, Our Evolving Conceptual Model of the Coastal Eutrophication Problem (2001) *Mar Ecol Prog Ser* 210:223-253.

Coastal Response Research Center (2010) Technical Readiness of Ocean Thermal Energy Conversion (OTEC), 246 pages.

Csordas et al., An integrated photobioreactor and foam fractionation unit for the growth and harvest of *Chaetoceros* spp. in open systems. (2004) *Aquacultural Engineering* 30:15-30.

Culp et al., High-Frequency Germ-Line Transmission of Plasmid DNA Sequencers Injected into Fertilized Zebrafish Eggs (1991) *Proc. Natl. Acad. Sci USA*, 88:7953-7957.

Czernik et al., Overview of Applications of Biomass Fast Pyrolysis Oil (2004) *Energy & Fuels* 18:590-598.

Danaei et al., The Preventable Causes of Death in the United States: Comparative Risk Assessment of Dietary, Lifestyle, and Metabolic Risk Factors (2009) *PLoS Medicine* 6:1-23.

Davis et al., Real-Time Observation of Taxa-Specitic Plankton Distributions: An Optical Sampling Methods (2004) *Marine Ecology Progress Series* 284:77-96.

Deegan, Changes in Body Composition and Morphology of Young-of-the-Year Gulf Menhaden, *Brevoortia patronus* Goode, in Fourleague Bay, Louisiana (1986) *J of Fish Biology* 29:403-415.

Drapcho et al., The Partitioned Aquaculture System: Impact of Design and Environmental Parameters on Algal Productivity and Photosynthetic Oxygen Production (2000) *Aquacultural Engineering* 21:151-168.

Durbin et al., Effects of Menhaden Predation on Plankton Populations in Narragansett Bay, Rhode Island (1998) *Estuaries* 21:449-465.

Durbin et al., Grazing Rates of the Atlantic Menhaden *Brevoortia tyrannus* as a Function of Particle Size and Concentration (1975) *Marine Biology* 33:265-277.

Edwards et al., The Harvest of Microalgae from the Effluent of a Sewage Fed High Rate Stabilization Pond by *Tilapia Nilotica*—Part 2: Studies of the Fish Pond (1981) *Aquaculture* 23:107-147.

Faludi, Fish for Fuel (2008) *WorldChanging* available at http://www.worldchanging.com/archives/007497.html (last visited Jun. 30, 2008).

Fox, Intensive Algal Culture Techniques (1983) *CRC Handbook of Mariculture*, McVey, JP (ed), 1:15-41 CRC Press, Florida.

Franklin, The Most Important Fish in the Sea (Sep. 2001) *Discovery* pp. 44-51.

Frey et al., Effects of micro-nutrients and major nutrients on natural phytoplankton populations (1980) *Journal of Plankton Research* 2:1-22.

Friedland et al., Formation and Seasonal Evolution of Atlantic Menhaden Juvenile Nurseries in Coastal Estuaries (1996) *Estuaries* 19:105-114.

Friedland et al., Influence of plankton on distribution patterns of the filter-feeder *Brevoortia tyrannus* (Pisces: Clupeidae) (1989) *Mar. Ecol. Prog. Ser.* 54:1-11.

Garrison et al., Fishing effects on spatial distribution and trophic guild structure of the fish community in the Georges Bank region (2000) *ICES Journal of Marine Science* 57:723-730.

Gjedrem, Genetic Variation in Quantitative Traits and Selective Breeding in Fish and Shellfish (1983) *Aquaculture* 33:51-72.

Gnansounou et al., Ethanol fuel from biomass: A Review (2005) *Journal of Scientific and Industrial Research* 64:809-821.

Gold, Biofuel Bet Aims to Harvest Fish that Feed on Algae (Aug. 18, 2009) *Wall Street Journal* (online), available at http://online.wsj.com/article/SB125055779852138901.html.

Grant, The relationship of bioenergetics and the environment to the field of cultured bivalves (1996) *Journal of Experimental Marine Biology and Ecology* 200:239-256.

Grima et al., Downstream Processing of Cell-Mass and Products (2004) *Handbook of Microalgal Culture: Biotechnology and Applied Phycology*, Richmond (ed). 10:215-252 Wiley-Blackwell.

Grimes et al., Spatial Distribution and Abundance of Larval and Juvenile Fish, Chlorophyll and Macrozooplankton around the Mississippi River Discharge Plume, and the Role of the Plume in Fish Recruitment (1991) *Mar. Ecol. Prog. Ser.* 75:109-119.

Guan et al., Metabolism traits of 'all-fish' growth hormone transgenic common carp (*Cyprinus carpio* L.) (2008) *Aquaculture* 284:217-223.

Hara et al., Lipid Extraction of Tissues with a Low-Toxicity Solvent (1978) *Anal. Biochein.* 90:420-426.

Hettler, Artificial Fertilization Among Ycllowfin and Gulf Menhaden (*Brevoortia*) and Their Hybrid (1968) *Transactions of Am. Fishers Soc'y* 97:119-123.

Hettler, Transporting Adult Larval Gulf Menhaden and Techniques for Spawning in the Laboratory (1983) *The Progressive Fish-Culturist* 45:45-48.

Hussenot, Emerging effluent management strategies in marine fish-culture farms located in European coastal wetlands (2003) *Aquaculture* 226:113-128.

Hutchins et al., Iron-limited Diatom Growth and Si:N Uptake Ratios in a Coastal Upwelling Regime (1998) *Nature* 393:561-564.

Inoue et al., Electroporation as a New Technique for Producing Transgenic Fish (1990) *Cell. Differ. Develop.* 29:123-128.

Irwin et al., Scaling-up From Nutrient Physiology to the Size-Structure of Phytoplankton Communities (2006) *Journal of Plankton Research* 28:1-13.

Jiao et al., Microbial production of recalcitrant dissolved organic matter: long-term carbon storage in the global ocean (2010) *Nature Reviews Microbiology* 8:593-599.

Jørgensen, Bivalve Filter Feeding Revisited (1996) *Mar. Ecol. Prog. Ser.* 142:287-302.

Joseph, Fatty Acid Composition of Commercial Menhaden, *Brevoortia* spp., Oils, 1982 and 1983 (1985) *Marine Fisheries Review* 47:30-37.

Kadereit et al., Evolutionarily Conserved Gene Family Important for Fat Storage (2008) *PNAS* 105:94-99.

Kaiser et al., The Gulf of Mexico Decommissioning Market (2006) *J. of Constr. Eng'g and Mgmt.* 132:815-26.

Kaiser, Offshore Decommissioning Cost Estimation in the Gulf of Mexico (2006) *J. of Constr. Eng'g and Mgmt.* 132:249-58.

Katija et al., A viscosity-enhanced mechanism for biogenic ocean mixing (2009) *Nature* 460:624-627.

Keller et al., Growth of Juvenile Atlantic Menhaden, *Brevoortia tyrannus* (Pisces: Clupeidae) in MERL Mesocosms: Effects of Eutrophication (1990) *Limnol. Oceanogr.* 35:109-122.

(56) References Cited

OTHER PUBLICATIONS

Kemmerer, Environmental Preferences and Behavior Patterns of Gulf Menhaden (*Brevoortia patron*) Inferred from Fishing and Remotely Sensed Data (1980) Conference on the Physiological and Behavioral Manipulation of Food Fish as Production and Management Tools, Bellagio, Italy, Nov. 3-8, 1977, printed on pp. 345-370 in *Fish Behavior and Its Use in the Capture and Culture of Fishes*, edited by Bardach et al., Manila: International Center for Living Aquatic Resources Management.
Kilham et al., COMBO: a defined freshwater culture medium for algae and zooplankton (1998) *Hydrobiologia* 377:147-159.
Kurokawa et al., Identification of cDNA Coding for a Homologue to Mammalian Leptin from Pufferfish Takifugu rubripes (2005) *Peptides* 26:745-750.
Kusdiana et al., Effects of Water on Biodiesel Fuel Production by Supercritical Methanol Treatment (2004) *Bioresource Technology* 91:289-295.
Kusdiana et al., Kinetics of Transesterification in Rapeseed Oil to Biodiesel Fuel as Treated in Supercritical Methanol (2001) *Fuel* 80:693-698.
Kyoto Protocol Reference Manual on Accounting of Emissions and Assigned Amount, United Nations Framework Convention on Climate Change. Nov. 2008.
Lamp, Breathless Coastal Seas: WWF Briefing Paper: Dead Ocean Zones—a Global Problem of the 21. Century (2008) *WWF Germany* pp. 2-19.
Latour et al., Toward Ecosystem-Based Fisheries Management: Strategies for Multispecies Modeling and Associated Data Requirements (2003) *Fisheries* 28:10-22.
Lazzaro et al., Planktivores and Plankton Dynamics: Effects of Fish Biomass and Planktivore Type (1992) *Canadian Journal of Fisheries and Aquatic Sciences* 49:1466-1473.
Lazzaro, A Review of Planktivorous Fishes: Their Evolution, Feeding Behaviours, Selectivities, and Impacts (1987) *Hydrobiologia* 146:97-167.
Leaver et al., Towards Fish Lipid Nutrigenomics: Current State and Prospects for Fin-Fish Aquaculture (2008) *Reviews in Fisheries Science* 16:71-92.
Lefebvre et al., Outdoor Phytoplankton Continuous Culture in a Marine Fish-Phytoplankton-Bivalve Integrated System: Combined Effects of Dilution Rate and Ambient Conditions on Growth Rate, Biomass and Nutrient Cycling (2004) *Aquaculture* 240:211-231.
Lekang, Aquaculture Engineering (2007) Blackwell Publishing Ltd., entire Chapter 8.
Lekang, Aquaculture Engineering (2007) Blackwell Publishing Ltd., entire Chapter 10.
Lekang, Aquaculture Engineering (2007) Blackwell Publishing Ltd., entire Chapter 13.
Lekang, Aquaculture Engineering (2007) Blackwell Publishing Ltd., entire Chapter 14.
Lekang, Aquaculture Engineering (2007) Blackwell Publishing Ltd., entire Chapter 15.
Lekang, Aquaculture Engineering (2007) Blackwell Publishing Ltd., entire Chapter 16.
Lekang, Aquaculture Engineering (2007) Blackwell Publishing Ltd., entire Chapter 17.
Lekang, Aquaculture Engineering (2007) Blackwell Publishing Ltd., entire Chapter 19.
Letisse et al., Enrichment of EPA and DHA from sardine by supercritical fluid extraction without organic modifier. I. Optimization of Extraction Conditions (2006) *J. Supercritical Fluids* 38:27-36 (abstract only).
Levin et al., Harvesting of Algae by Froth Flotation (1961) *Resource Research, Inc.* 10:169-175.
Li et al., Biofuels from Microalgae (2008) *Biotechnol. Progress* pp. 815-820.
Lipton, *Pfiesteria's* Economic Impact on Seafood Industry Sales and Recreational Fishing (1999) in Proceedings of the Conference, *Economics of Policy Options for Nutrient Management and Pfiesteria*, Gardner and Koch, editors, College Park: Center for Agricultural and Natural Resource Policy, University of Maryland pp. 35-38.
Lu et al., Harmful Algal Bloom Causitive Collected from Hong Kong Waters (2004) *Hydrobiologia* 512:231-238.
Lu et al., Pantropic Retroviral Vector Integration, Expression, and Germline Transmission in Medaka (*Oryzias latipes*) (1997) *Mol. Mar. Biol. Biotechnol.* 6:289-295.
McGinnis et al. Characterization of the growth and lipid content of the diatom *Chaetoceros muelleri* (1997) *Journal of Applied Phycology* 9:19-24.
McGonnell et al., Fishing for Gene Function—Endocrine Modelling in the Zebrafish (2006) *J. Endocrinol.* 189:425-439.
Metz et al., Molecular Biology and Physiology of the Melanocortin System in Fish: A Review (2006) *Gen Comp Endocrinol.* 148:150-162.
Moloney et al., The Size-Based Dynamics of Plankton Food Webs. I. A Simulation Model of Carbon and Nitrogen Flows (1991) *J. of Plankton Research* 13:1003-1038.
Morrissey, Lipid Content in Troll-caught Albacore Tuna and Correlations with Geographical Location, Physical Measurements and Seasonality (undated) *Jour Aquatic Food Product Technology* 13:41-52.
Mueller et al., Effect of Silver Carp *Hypophthahnichthys molitrix* and Freshwater Mussel Elliptio complanata Filtration on the Phytoplankton Community of Partitioned Aquaculture System Units (2004) *J. of the World Aquaculture Soc'y* 35:372-382.
Mueller-Feuga, Microalgae for Aquaculture The Current Global Situation and Future Trends (2004) *Handbook of Microalgal Culture: Biotechnology and Applied Phycology* Richmond (ed) pp. 380-391 Wiley-Blackwell.
Müller et al., Efficient Transient Expression System Based on Square Pulse Electroporation and in vivo Luciferase Assay of Fertilized Fish Eggs (1993) *FEES Letts.* 324:27-32.
Müller et al., Introducing Foreign Genes into Fish Eggs with Electroporated Sperm as a Carrier (1992) *Mol. Mar. Biol. Biotechnol.* 1:276-281.
Murakami et al., Micromachined Electroporation System from Transgenic Fish (1994) *J. Biotechnol.* 34:35-42.
Murashita et al., Production of Recombinant Leptin and its Effects on Food Intake in Rainbow Trout (*Oncorhynchus mykiss*) (2008) *Comp. Biochem. Physiol. B*, 150:377-384.
Needleman et al., A General Method Applicable to the Search for Similarities in the Amino Acid Sequence of Two Proteins (1970) *J. Mol. Biol.* 48:443-453.
Nelson et al., Gastroenteropancreatic Hormones and Metabolism in Fish (2006) *General and Comparative Endocrinology* 148:116-124.
Neori et al. Integrated Aquaculture: Rationale, Evolution and State of the Art Emphasizing Seaweed Biofiltration in Modern Mariculture (2004) *Aquaculture* 231:361-391.
Newell, Ecosystem Influences of Natural and Cultivated Populations of Suspension-Feeding Bivalve Molluscs: A Review (2004) *J. Shellfish Res.* 23:51-61.
Nishida, Development of the appendicularian *Oikopleura dioica* (2008) *Develop. Growth Differ.* 50:S239-256.
Oasmaa et al., Fuel Oil Quality of Biomass Pyrolysis Oils—State of the Art for End Users (1999) *Energy & Fuels* 13:914-921.
Officer et al., The Possible Importance of Silicon in Marine Eutrophication (1980) *Mar. Ecol. Prog. Ser.* 3:83-91.
OMEGA Protein Corporation, Product Specifications for Menhaden Fish Oil (May 15, 2008).
OMEGA Protein Corporation, U.S. SEC Form 10-K Report for Fiscal Year Ending Dec. 31, 2007 (2008).
OSPAR Commission, OSPAR Integrated Report 2003 on the Europhication Status (2003) London, UK.
Paerl et al., Chapter 8 in Ecology of Harmful Algae (2006) *Springer Berlin Heidelberg* pp. 95-109.
Pandian et al., Ploidy Induction and Sex Control in Fish (1998) *Hydrobiologia* 384:167-243.
Patil et al., Fatty acid composition of 12 microalgae for possible use in aquaculture feed (2007) *Aquaculture Int* 15:1-9.
Pearson et al., Improved Tools for Biological Sequence Comparison (1988) *Proc. Natl. Acad. Sci. (USA)* 85:2444-2448.

(56) References Cited

OTHER PUBLICATIONS

Peck, On the food of the menhaden (1893) *Bull. U.S. Fish. Comm.* 13:113-126.

Piccolo, Aquatic Biofuels (May 2008) available at http://km.fao.org/fileadmin/userupload/fsn/docs/Microsoft%20Word%20-%20Aquaticbiofuels.pdf.

Piccolo, Aquatic Biofuels New Options for Bioenergy (undated) *Thesis Topic for a MBA*, University of Malta, Rome Campus, available at http://www.scribd.com/doc/5598814/aquaticbiofuelpresweb.

Piferrer, Endocrine Sex Control Strategies for the Feminization of Teleost Fish (2001) *Aquaculture* 197:229-281.

Pillay et al., Reproduction and Genetic Selection (2005) *Aquaculture: Principles and Practices, Blackwell Publishing* pp. 174-196.

Powell et al., Early Life History of Atlantic Menhaden *Brevoortia tyrannus*, and Gulf Menhaden, *B. patronus* (1986) *Fishery Bulletin* 84:991-995.

Powell, A Comparison of Early-Life-History Traits in Atlantic Menhaden *Brevoortia tyrannus* and Gulf Menhaden *B. patronus* (1993) *Fishery Bulletin* 91:119-128.

Quinlan et al., From Spawning Grounds to the Estuary: Using Linked Individual-based and Hydrodynamic Models to Interpret Patterns and Processes in the Oceanic Phase of Atlantic Menhaden *Brevoortia tyrannus* Life History (1999) *Fisheries Oceanography*, 8:suppl. 2:224-246.

Rabalais et al., Excess Nutrients from the Mississippi River Degrade Water Quality in the Gulf of Mexico (1998) *III. Agric. Pesticides Conference* pp. 94-102.

Rabalais et al., Nutrient Changes in the Mississippi River and System Responses on the Adjacent Continental Shelf (1996) *Estuaries* 19:386-407.

Rabalais, et al., Hypoxia in the Gulf of Mexico (2001) *J. of Environ. Qual.*, 30:320-329.

Rahman et al., Growth and Nutritional Trials on Transgenic Nile Tilapia Containing an Exogenous Fish Growth Hormone Gene (2001) *J. of Fish Biology* 59:62-78.

Raskoff et al., Collection and Culture Techniques for Gelatinous Zooplankton (2003) *Biol. Bull.* 204:68-80.

Raven, Nutritional and Neuroendocrine Control of Appetite in Transgenic Coho Salmon (Apr. 2006) *Master of Science in Zoology*, University of British Columbia [online], retrieved on Feb. 14, 2010 from the Internet site: https://circle.ubc.ca/bltstream/handle/2429/17748/ubc, pp. 2006-0292.pdf.

Raynie et al., A Comparison of Larval and Postlarval Gulf Menhaden, *Brevoortia patronus*, Growth Rates Between an Offshore Spawning Ground and an Estuarine Nursery (1994) *Fishery Bulletin* 92:890-894.

Redfield, The Biological Control of Chemical Factors in the Environment (1958) *American Scientist* 46:205-222.

Refstie, Long-term protein and lipid growth of Atlantic salmon (*Salmo salar*) fed diets with partial replacement of fish meal by soy protein products at medium or high lipid level (2001) *Aquaculture* 193:91-106.

Richardson, Remote Sensing of Algal Bloom Dynamics (1996) *BioScience* 46:492-501.

Rocha et al., Application of Inducible and Targeted Gene Strategies to Produce Transgenic Fish: A Review (2004) *Marine Biotechnology* 6:118-127.

Roelke, et al., The Diversity of Harmful Algal Bloom-Triggering Mechanisms and the Complexity of Bloom Initiation (2001) *Human and Ecological Risk Assessment* 7:1347-1362.

Roessler, Effects of Silicon Deficiency on Lipid Composition and Metabolism in the Diatom Cyclotella Cryptica (1988) *J. Phycol.* 24:394-400.

Saka et al., Biodiesel Fuel from Rapeseed Oil as Prepared in Supercritical Methanol (2001) *Fuel* 80:225-231.

Selman et al., Eutrophication and Hypoxia in Coastal Areas: A Global Assessment of the State of Knowledge (2008) *WRI Policy Note* pp. 1-6.

Sheehan et al., A Look Back at the U.S. Department of Energy's Aquatic Species Program: Biodiesel from Algae (1998) *National Renewable Energy Laboratory* pp. 1-294.

Sheridan, Lipid Dynamics in Fish: Aspects of Absorption, Transportation, Deposition and Mobilization (1988) *Comp. Biochem. Physiol.* 90B:679-690.

Shimeno et al., Metabolic Response to Feeding Rates in Common Carp, *Cyprinus carpio* (1997) *Aquaculture* 151:371-377.

Smith et al., Comparison of Biosequences (1981) *Adv. AppL Math.* 2:482-489.

Song et al., Creation of a Genetic Model of Obesity in Teleost (2007) *The FASEB Journal* 21:2042-2049.

Sournia et al., Marine Phytoplankton: How Many Species in the World Ocean? (1991) *J Plankton Res* 13:1093-1099.

Spath, et al., Preliminary Screening—Technical and Economic Assessment of Synthesis Gas to Fuels and Chemicals with Emphasis on the Potential for Biomass-derived Syngas (2003) *NREL/TP-510-34929*.

Spolaore et al., Commercial Applications of Microalgae (2006) *J. Biosci. and Bioeng.* 101:87-96.

Steigers, Demonstrating the Use of Fish Oil as Fuel in a Large Stationary Diesel Engine (2002) *Advances in Seafood Byproducts*, conference proceedings, Alaska Sea Grant, Fairbanks, Alaska, 14 pages.

Stephen, The Reproductive Biology of the Indian oyster *Crassostrea madrasensis* (Preston) II. Gametogenic Cycle and Biochemical Levels (1980) *Aquaculture* 21:147-153.

Stuart et al., Filtration of Green Algae and Cyanobacteria by Freshwater Mussels in the Partitioned Aquaculture System (2001) *J. World Aquaculture Soc.* 32:105-111.

Symonds et al., Electroporation of Salmon Sperm with Plasmid DNA: Evidence of Enhanced Sperm/DNA Association (1994) *Aquaculture* 119:313-327.

Szelei et al., Liposome-Mediated Gene Transfer in Fish Embryos (1994) *Transgeneic Res.* 3:116-119.

Tave, Inbreeding and Brood Stock Management, *FAO Fisheries Technical Paper* 392 (1999).

Tave, Selective Breeding Programmes for Medium-sized Fish Farms, *FAO Fisheries Technical Paper* 352 (1995).

Taylor et al., Hybridization of *Cyprinus carpio* and *Carassius auratus*, the First Two Exotic Species in the Lower Laurentian Great Lakes (1977) *Environmental Biology of Fishes* 1:205-208.

Technical Article, Biofuels from Aquatic Resources: Diesel from Fish Waste, Biofuel from Algae (Feb. 2009) *Eurofish Magazine* 1:46-49.

Turker et al., Comparative Nile Tilapia and Silver Carp Filtration Rates of Partitioned Aquaculture System Phytoplankton (2003) *Aquaculture* 220:449-457.

Turker et al., Effect of Nile tilapia, *Oreochromis niloticus* (L.), Size on Phytoplankton Filtration Rate (2003) *Aquaculture Research* 34:1087-1091.

Turker et al., Effect of Temperature and Phytoplankton Concentration on Nile Tilapia *Oreochromis niloticus* (L.) Filtration Rate (2003) *Aquaculture Research* 34:453-459.

Turker et al., Filtration of Green Algae and Cyanobacteria by Nile Tilapia, *Oreochromis niloticus*, in the Partitioned Aquaculture System (2003) *Aquaculture* 215:93-101.

Turner et al., Fluctuating Silicate:Nitrate Ratios and Coastal Plankton Food Webs (1998) *Proc. Natl. Acad. Sci. USA* 95:13048-13051.

Turner, Element Ratios and Aquatic Food Webs (2002) *Estuaries* 25:694-703.

Tyson et al., Biomass Oil Analysis: Research Needs and Recommendations (2004) *NREL/TP-510-34796*.

(56) References Cited

OTHER PUBLICATIONS

Vaughan et al., Assessment and Management of Atlantic and Gulf Menhaden Stocks (1991) *Marine Fisheries Review* 53:49-57.

Vaughan et al., Population Characteristics of Gulf Menhaden, *Brevoortia patronus* (2000) *NOAA Technical Report* NMFS 149:1-19.

Vega, Ocean Thermal Energy Conversion Primer (winter 2002/2003) *Mar Technol Soc J* 6:25-35.

Vijverberg, Culture techniques for studies on the growth, development and reproduction of copepods and cladocerans uner laboratory and in situ conditions: a review (1989) *Freshwater Biology* 21:317-373.

Volkoff et al., Neuropeptides and the control of food intake in fish (2005) *General and Comparative Endocrinology* 142:3-19.

Ware et al., Coral reefs: sources or sinks of atmospheric $CO_2$? (1991) *Coral Reefs* 11:127-130.

Wilkerson, Capturing the Potential in Waste Heat (1978) *Tennessee Valley Perspective* 9:4-10.

Wurts, Sustainable Aquaculture in the Twenty-First Century (2000) *Reviews in Fisheries Science* 8:141-150.

Zbikowska, Fish can be first—advances in fish transgenesis for commercial applications (2003) *Transgenic Research* 12:379-389.

Zelenin et al., The Delivery of Foreign Genes into Fertilized Fish Eggs Using High-Velocity Microprojectiles (1991) *FEES Letts.* 287:118-120.

Zohar et al., Endocrine Manipulations of Spawning in Cultured Fish: from Hormones to Genes (2001) *Aquaculture* 197:99-136.

\* cited by examiner

SOURCING PHOSPHORUS AND OTHER NUTRIENTS FROM THE OCEAN VIA OCEAN THERMAL ENERGY CONVERSION SYSTEMS

CROSS-REFERENCE TO RELATED APPLICATIONS

This application claims priority to U.S. Provisional Patent Application No. 61/483,376, filed May 6, 2011, which provisional application is incorporated herein by reference in its entirety. All patents and patent applications cited in this application, all related applications referenced herein, and all references cited therein are incorporated herein by reference in their entirety as if restated here in full and as if each individual patent and patent application was specifically and individually indicated to be incorporated by reference.

1. FIELD OF THE INVENTION

Culturing algae to produce biofuel requires steady and economical supplies of carbon (C), nitrogen (N), phosphorus (P), potassium (K) and minor nutrients, such as silicon (Si) and iron (Fe). The costs of supplying large amounts of C, N, P, and K to an algae culture can be a significant expense. Provided herein are methods and systems that reduce the cost of supplying C, N, P, and K to an algal culture by recovering the nutrients from deep water that are normally inaccessible to algae growing near the surface. Also provided herein are methods and systems for feeding the algae to planktivorous organisms, for example, fish, extracting lipids from the planktivorous organisms, and polishing the extracted lipids to make biofuel and other useful products. The methods and systems provided herein contemplate controlling the sourcing of the nutrients from the deep water, controlling the delivery of the nutrients to the algal culture, controlling the growth of the algal culture, and controlling the feeding of the algal culture to the planktivorous organisms.

2. BACKGROUND OF THE INVENTION

The world's oceans comprise a plurality of stratified layers. According to water density, an ocean is divided into three horizontal depth zones: the mixed layer, pycnocline, and deep layer. Where a decline in temperature with depth is responsible for the increase in density with depth, the pycnocline is also a thermocline. On the other hand, if an increase in salinity is responsible for the increase in density with depth, the pycnocline is also a halocline. Typically, the pycnocline extends to a depth of 500 to 1000 m (1600 to 3300 ft). Water from different layers do not mix normally. However, the combination of persistent winds, Earth's rotation (the Coriolis effect), and restrictions on lateral movements of water caused by shorelines induces upward water movements. Coastal upwelling occurs where Ekman transport moves surface waters away from the coast; surface waters are replaced by water that wells up from below. Beside wind-driven upwelling, geostrophic currents also generate upwellings in the oceans.

The term "upwelling" as used herein refers to the upward directional movement of a mass of water from a source to a target within a body of water, such as but not limited to an ocean, an offshore area, a coastal area, or a lake. The source is characterized by its horizontal location ("source position") and/or its vertical location ("source depth") in the body of water. The position can be specified by its latitude and/or its longitude, or by its proximity to one or more oceanographic features. The target can be described similarly by its location ("target position") and/or the depth of the target ("target depth"). Upwelling occurs where the depth of the source is greater than the depth of the target. The mass of water transferred from a source to a target of lesser depth is referred to as "upwelled water."

In terms of exposure to sunlight, a body of water comprises a photic zone and an aphotic zone. The photic zone is the layer of water in a body of water, such as a lake or ocean, that is penetrated by sufficient sunlight for photosynthesis to occur. It extends from the surface downwards to a depth where light intensity falls to 1% of that at the surface. The thickness of the photic zone depends on the extent of light attenuation in the water column and is thus greatly affected by turbidity. The photic zone can be about a few centimeters in depth in turbid eutrophic lakes and up to about 200 meters in the open ocean. The aphotic zone is the layer of water beneath the photic zone that supports a minimum of photosynthetic activity, if any.

Primary production occurs predominantly in the photic zone where autotrophic organisms, such as microalgae, grow under sunlight and consume the nutrients in the photic zone. Heterotrophic organisms, e.g., zooplankton, feed on the autotrophic organisms, and the food web continues with the predation of phytoplankton and zooplankton by larger organisms, such as fishes, shellfishes, birds, and mammals. The particulate waste products produced by organisms in the photic zone and decaying bodies of dead organisms sink into and enrich deeper water in the aphotic zone. The water in the photic zone generally contains less nutrients than the water in the aphotic zone. Due to the paucity of mixing between surface water and denser water in the deep layer, many nutrients are deposited and accumulated near or at the bottom of a water column. Upwelled water derived from greater depth is thus richer with nutrients than surface water.

In certain embodiments, a nutrient profile comprises the concentration(s) of one or more of the following nutrients: C, N, P, K, and/or minor nutrients, such as Si and Fe, their organic and/or inorganic form, and their dissolved and/or particulate forms. In certain embodiments, the profile can also be expressed in terms of the relative amounts of nutrients, such as a stoichiometric ratio. For example, it can correspond to the Redfield ratio for diatoms which is $C:Si:N:P=106:15:16:1$. In certain embodiments, an upwelling of water from a greater depth increases the concentrations of C, N, P, K, and/or minor nutrients, such as Si and Fe, at a target near the surface. Many methods well known in the art can be used to determine the concentrations of nutrients in water.

The nutrient profile of the water at a source is different from the nutrient profile of the water at a target before an episode of upwelling. The arrival of upwelled water from the source changes the nutrient profile at the target. The desirability of obtaining upwelled water from a source of greater depth, which is richer with nutrients than water at a target, growing algae in the upwelled nutrient-rich water at the target, and harvesting the algae, is explained in International Patent Publication No. WO 2010/141794 A1, incorporated herein by reference in its entirety. The desirability of pumping devices, which are purportedly useful as sub-sea collectors is described in International Patent Publication No. WO 2004/070165 A1; and the desirability of using Ocean Thermal Energy Conversion ("OTEC") systems to generate biomass is explained in U.S. Patent Application No. 2002/031823 A1 and U.S. Pat. No. 6,863,027 B2.

Whereas it is desirable to be selective about the nutrients provided to the algal culture at the target, a need exists for an approach to selectively control the sourcing of the nutrients from the deep water, using OTEC, and the like, to selectively control the delivery of these nutrients to the algal culture, and/or to selectively control the feeding of the algal culture to the planktivorious organisms, for example, fish.

3. SUMMARY OF THE INVENTION

In one aspect, the present invention provides a controlled method for producing biofuel and lipids from algae.

In certain embodiments, the controlled method for producing biofuel and lipids from algae comprises: (i) providing upwelled water in a body of water; (ii) culturing algae in the upwelled water; (iii) feeding the algae to planktivorious organisms; (iv) extracting lipids from the planktivorious organisms; and (v) polishing the lipids to make biofuel or other useful products. In certain embodiments, the planktivorious organism is a planktivorious fish and the extracted lipids are fish lipids. In certain embodiments, the upwelled water is provided in the body of water by using an open-cycle OTEC system.

In certain embodiments, the extracted fish lipids are polished to make biofuel. In certain embodiments, the biofuel is used in liquid fuels, such as diesel, biodiesel, kerosene, jet-fuel, gasoline, JP-1, JP-4, JP-5, JP-6, JP-7, JP-8, Jet Propellant Thermally Stable (JPTS), Fischer-Tropsch liquids, alcohol-based fuels including ethanol-containing transportation fuels, or other biomass-based liquid fuels including cellulosic biomass-based transportation fuels.

In certain embodiments, the extracted fish lipids are polished to make extracted omega 3 fatty acids. In certain embodiments, the omega 3 fatty acids is eicosahexaenoic acid (EPA), docosahexaenoic acid (DHA), or derivatives thereof.

In certain embodiments, the body of water is a target site. In certain embodiments, the target site is selected to provide an upwelling of a nutrient-rich source of water. In certain embodiments, the cold water pipe of the OTEC system is varied by depth and/or position to access a particular nutrient profile for the target site. In certain embodiments, the nutrient-rich source of water provides a limiting nutrient. In certain embodiments, the limiting nutrient is C, N, P, K, Si or Fe. In certain embodiments, the method further comprises providing micronutrients to the target site. In certain embodiments, the micronutrients are inorganic salts. In certain embodiments, the inorganic salts are Si, Fe, Ca, Zn, Mn, B, Mo, Mg, V, Sr, Al, Rb, Li, Cu, Co, Br, I or Se. In certain embodiments, the micronutrients are provided to prevent or overcome nutrient limitation at the target site. In certain embodiments, the micronutrients are provided to control the growth of a population of algae at the target site. In certain embodiments, the method further comprises providing one or more species of algae to the target site.

In another aspect, the present invention provides a controlled system for producing biofuel and lipids from algae.

In certain embodiments, the controlled system for producing biofuel and lipids from algae comprises: (i) means for generating or controlling upwelled water in a body of water; (ii) means for culturing algae in the upwelled water; (iii) means for feeding the algae to planktivorious organisms; (iv) means for extracting lipids from the planktivorious organisms; and (v) means for polishing the lipids to form biofuel or other useful products. In certain embodiments, the means for generating or controlling the upwelled water in the body of water comprises an open-cycle OTEC system. In certain embodiments, the planktivorious organism is a planktivorious fish and the extracted lipids are fish lipids.

In certain embodiments, the body of water is a target site. In certain embodiments, the cold water pipe of the OTEC system is varied by depth and/or position to access a particular nutrient profile for the target site. In certain embodiments, the system further comprises one or more enclosures containing the fish. In certain embodiments, the system further comprises means to monitor and regulate the environment of the target site and/or the enclosures. In certain embodiments, the means to monitor and regulate the environment of a target site and/or the enclosures is selected from the group consisting of means to monitor and/or adjust the pH, salinity, dissolved oxygen, temperature, turbidity, and concentrations of nutrients to the target site and/or the enclosures.

4. DETAILED DESCRIPTION OF THE INVENTION

In certain embodiments, the methods provide culturing of planktivorious organisms in conjunction with an algal culture supported by upwelled nutrient-rich water, and harvesting the organisms to produce biofuel. In certain embodiments, the methods and systems generate an upwelling of nutrient-rich water from a source to a target in a body of water that comprises a nutrient-rich source of water but where natural upwelling is negligible or non-existent. The availability of nutrients at an oligotrophic target site stimulates the rapid growth of algae, leading to an algal bloom. In certain embodiments, the methods provided herein can further comprise maintaining the upwelling once it has been initiated. In certain embodiments, provided herein are methods and systems for controlling the upwelling to facilitate the growth of algae at a target site in a body of water that comprises an upwelling a nutrient-rich source of water.

In one embodiment, the methods and systems provided herein comprise any man-made devices that are present in or installed in a body of water to modify a flow of water, such that nutrient-rich water from a source is directed towards a target. Non-limiting examples of such man-made devices are mechanical objects that are installed or abandoned on the sea floor (also known as "hangs"), many of which become obstructions to shipping and oil/gas exploration. Such objects can be relocated to and/or aggregated at one or more locations on the sea floor to modify one or more currents in a body of water. Other man-made devices provided herein include but are not limited to network of pipelines, risers, and platforms that are installed for exploration and production of oil and/or natural gas and that can be modified for the purpose of certain embodiments by one of skill in the art. Examples of such oil and gas platform-based devices are described in International Patent Publication No. WO 2010/104908, which is incorporated herein by reference its entirety.

In certain embodiments, the methods and systems provided herein comprise an Ocean Thermal Energy Conversion ("OTEC") systems, which produce energy by exploiting the temperature difference between thermoclines, e.g. the warm surface water and the cold water in deeper ocean strata. OTEC systems can be closed- or open-cycle; in the former an enclosed environment pumps liquid between the thermal zones, whereas in the latter the cold water itself is brought up from the depths. Typically an open-cycle OTEC system includes a shore- or barge-mounted plant and a large diameter cold water pipe. Cold water from the ocean depths is pumped to the surface through the cold water pipe. The cold water is then directed into a power module that also receives warm water from the surface. The temperature differential between the cold water and warm water then generates electric energy through well-known techniques such as Rankine cycle-based power generation. OTEC systems are more thoroughly described in multiple literature references such as those by Vega (Vega, L. A., "Ocean Thermal Energy Conversion Primer," Mar Technol Soc J, 6: 25-35.) and from the Coastal Response Research Center (2010, Technical Readiness of Ocean Thermal Energy Conversion (OTEC).) See also U.S. Pat. No. 5,582,691, which is incorporated herein by reference in its entirety.

The relatively large temperature differential required for efficient OTEC operation (typically at least 20° C.) means the OTEC system will operate in water depths of at least 3,000 feet. Since the source depth of a desired upwelling may correspond to that required for operation of the OC-OTEC, in certain embodiments an open-cycle OTEC system will provide the nutrients that will stimulate growth of algae in the target depth of the body of water.

The instant invention contemplates the use of OTEC systems to access a particular nutrient profile in the cold deep water, so as to control the delivery of selected nutrients to the algal culture.

In certain embodiments of the invention, the cold water pipe of the OTEC system, which provides an intake for the cold deep water at the source, is varied by depth and/or position to access a particular nutrient profile. For example, in certain embodiments, the OTEC cold water pipe is varied by depth and/or position to access C, N, P, K, and/or minor nutrients, such as Si and Fe, so these nutrients may be brought to a target near the surface. In certain embodiments, the OTEC cold water pipe is varied by depth and/or position to access a particular ratio of nutrients, for example, the Redfield ratio which is C:Si:N:P=106:15:16:1.

Deployment of open-cycle OTEC systems has been limited in part because of environmental concerns about the bloom of phytoplankton caused by nutrients brought to the surface. In the current invention that nutrient flow is embraced and harnessed to beneficial effect by harvesting the phytoplankton via the methods described herein.

Another factor limiting deployment of offshore OTEC systems has been the need to transport the power so generated. The classic method of doing so, undersea cables, add considerable expense and raise significant environmental concerns because of seafloor damage caused during their deployment. In one embodiment of this invention, by co-locating the OTEC system with a method for harvesting phytoplankton via planktivorious fish (as is described herein), the power so generated can be used to process the fish on-site. Thus the detrimental aspects of power transport can be avoided with this invention.

The instant invention also contemplates methods for controlling the growth of the algal culture at the target site. Exemplary methods and systems for controlling the growth of the algal culture at the target site are described in U.S. Provisional Application No. 61/483,316, filed May 6, 2011.

Accordingly, in another aspect, the methods comprise providing one or more species of algae to a target site, such that the algae can consume the nutrients brought by an upwelling at the target site. In certain embodiments, without the upwelling, the water at a target site is oligotrophic and comprises mostly picoplankton and nanoplankton, such as *Prochlorococcus* and *Synechococcus*, that are in the size range of 0.2 to 2 micrometer. There are few planktivorious fish that can efficiently filter plankton in this size range. Other algae are only present at a low level at the target site and may take a period of time to expand in numbers. In certain embodiments, the algae are selected according to their abilities to assimilate efficiently the nutrients transferred by an upwelling to the target site, taking into account the nutrient profile of the site over a period of time. In certain embodiments, the algae are also selected according to their suitability as food for the planktivorious organisms provided herein for harvesting. For example, it is desirable that the size of the algae matches the filter-feeding abilities of the plantivorous organisms.

A limiting nutrient is a nutrient that dictates, at least in part, the growth rate of one or more groups of organisms, such as bacterioplankton and/or phytoplankton, at a site or in a body of water. Depending on their initial concentrations, one or more of the other nutrients, such as C, N, P, K, Si, and Fe, can become depleted as they are consumed by growing organisms. Since different organisms have different nutrient requirements and growth rates, it is expected that a nutrient can be depleted and become limiting for certain groups of organisms and not limiting for others. Such a condition can select for organisms that are less dependent on the depleted nutrient. Organisms experiencing nutrient limitation is at a growth disadvantage relative to other organisms. For example, nitrogen-fixing organisms, such as cyanobacteria, are favorably selected in a body of water that is nitrogen-limiting. Silicon is required for the growth of diatoms. In certain embodiments, as limiting nutrients affect significantly the primary and secondary productivities of a body of water, the methods and systems provide upwelled water and/or added nutrients to prevent or overcome nutrient limitation at a target site, and/or to steer the growth of a population of algae so that algal species that are preferably consumed by the planktivorious organisms provided herein become the major species in the growing population. Nutrients that can be added to the target site include micronutrients, such as inorganic salts comprising Si, Fe, Ca, Zn, Mn, B, Mo, Mg, V, Sr, Al, Rb, Li, Cu, Co, Br, I, and Se.

As used herein the term "algae" refers to any organisms with chlorophyll and a thallus not differentiated into roots, stems and leaves, and encompasses prokaryotic and eukaryotic organisms that are photoautotrophic or photoauxotrophic. The term "algae" includes macroalgae (commonly known as seaweed) and microalgae. For certain embodiments, algae that are not macroalgae are preferred. The terms "microalgae" and "phytoplankton," used interchangeably herein, refer to any microscopic algae, photoautotrophic or photoauxotrophic protozoa, photoautotrophic or photoauxotrophic prokaryotes, and cyanobacteria (commonly referred to as blue-green algae and formerly classified as Cyanophyceae). The use of the term "algal" also relates to microalgae and thus encompasses the meaning of "microalgal." The term "algal composition" refers to any composition that comprises algae, and is not limited to the body of water or the culture in which the algae are cultivated. An "algal culture" is an algal composition that comprises live algae.

The microalgae provided herein are also encompassed by the term "plankton" which includes phytoplankton, zooplankton and bacterioplankton. The methods and systems provided herein can be used with a composition comprising plankton, or a body of water comprising plankton. A mixed algal composition used in certain embodiments provided herein comprises one or several dominant species of macroalgae and/or microalgae. Microalgal species can be identified by microscopy and enumerated by counting, microfluidics, or flow cytometry, which are techniques well known in the art. A dominant species is one that ranks high in the number of algal cells, e.g., the top one to five species with the highest number of cells relative to other species. In various embodiments, one, two, three, four, or five dominant species of algae are present in an algal composition.

The instant invention further contemplates methods for controlling the feeding of the algal culture to the planktivorious organisms at the target site.

Accordingly, in yet another aspect, the methods comprise providing one or more species of planktivorious organisms to a target site, such that the planktivorious organisms can consume the algae that are growing due to the nutrients brought by an upwelling at the target site. Exemplary methods and systems for controlling the feeding of the algal culture to the planktivorious organisms at the target site are described in U.S. Provisional Application No. 61/483,316, filed May 6, 2011.

Non-limiting examples of planktivorious organisms include fishes, shellfishes (e.g., bivalves and gastropods), crustaceans (e.g., brine shrimps, krills), and zooplankton (e.g., copepods, cladocerans, and tunicates). In one embodiment, the algae can be harvested with planktivorious, herbivorous, or omnivorous fishes of the order Clupeiformes, Siluriformes, Cypriniformes, Mugiliformes, and/or Perciformes. Preferably, at least one planktivorious species of fish in the order Clupeiformes is used. Non-limiting examples of useful fishes include menhadens, shads, herrings, sardines, hilsas, anchovies, catfishes, carps, milkfishes, shiners, paddlefish, and/or minnows. Gut content analysis can determine the diet of a fish provided herein. Techniques for analysis of gut content of fish are known in the art. The choice of fish for use in the harvesting methods provided herein depends on a number of factors, such as the palatability and nutritional value of the cultured algae as food for the fishes, the lipid composition and content of the fish, the feed conversion ratio, the fish growth rate, and the environmental requirements that encourage feeding and growth of the fish.

One or more species of fish can be used to harvest the algae from an algal composition. In certain embodiments, a fish population is mixed and thus comprises one or several major species of fish. A major species is one that ranks high in the head count, e.g., the top one to five species with the highest head count relative to other species. The methods provided herein can employ such species of fishes that are otherwise used as human food, animal feed, or oleochemical feedstocks, for making biofuel. In certain embodiments, depending on the economics of operating an algal culture facility, some of the fishes used in the present method can be sold as human food, animal feed or oleochemical feedstock. Stocks of fish provided herein can be obtained initially from fish hatcheries or collected from the wild. In a preferred embodiment, cultured fishes are used. The fishes may be fish fry, juveniles, fingerlings, or adult/mature fish. In certain embodiments, fry and/or juveniles that have metamorphosed are used. Any fish aquaculture techniques known in the art can be used to stock, maintain, reproduce, and gather the fishes provided herein.

In addition to means for generating or controlling upwelling, the systems provided herein can comprise at least one enclosure containing fish, means for gathering the fish, means for extracting lipids from the fishes, and means for converting the lipids into biofuel. The term "enclosure" refers to a water-containing enclosure in which algae are cultured and harvested by fish. In certain embodiments, the enclosures provided herein can be but are not limited to tanks, cages, and/or net-pens. A cage can be submerged, submersible or floating in a body of water, such as a lake, a bay, an estuary, or the ocean. In certain embodiments, in addition to algae and fishes, the enclosures provided herein may comprise one or more additional aquatic life forms, such as but not limited to bacteria, zooplankton, aquatic plants, crustaceans (cladocera and copepoda), insects, worms, nematodes, and mollusks.

In certain embodiments, the systems provided herein further comprise means for connecting the enclosures to each other, to other parts of the system and to water sources and points of disposal. The connecting means facilitates fluid flow, temporarily or permanently, and can include but is not limited to a network of channels, hoses, conduits, viaducts, and pipes. In certain embodiments, the systems further comprise means for regulating the rate, direction, or both the rate and direction, of fluid flow throughout the network, such as flow between the enclosures and other parts of the system. The flow regulating means can include but is not limited to pumps, valves, manifolds, and gates. In certain embodiments, the systems provided herein also provide means to monitor and regulate the environment of a target site and/or the enclosures, which include but is not limited to means to monitor and/or adjust the pH, salinity, dissolved oxygen, temperature, turbidity, concentrations of nutrients, especially micronutrients (e.g., Si, Fe, Zn, Ca, Mn, B, Mo, Mg, V, Sr, Al, Rb, Li, Cu, Co, Br, I, and Se) and other aquatic conditions. Any fish processing technologies and means known in the art can be applied to obtain lipids, proteins, and hydrocarbons from the fishes.

In certain embodiments, the methods and systems provided herein can be practiced in many parts of the world, such as but not limited to the coasts, the contiguous zones, the territorial zones, and the exclusive economic zones of the United States. In certain embodiments, a system provided herein can be established at the coasts of Gulf of Mexico, or in the waters of the Gulf of Mexico basin, Northeast Gulf of Mexico, South Florida Continental Shelf and Slope, Campeche Bank, Bay of Campeche, Western Gulf of Mexico, Northwest Gulf of Mexico and in the waters around islands in the Pacific including Hawaii.

In certain embodiments, provided herein are a biofuel feedstock or a biofuel comprising lipids, hydrocarbons, or both, derived from fish that harvested algae according to the methods provided herein.

Exemplary methods and systems of using algae for the production of biofuels are described in International Patent Publication Nos. WO 2010/036333, WO 2010/036334, WO 2010/141794, and WO 2010/147955, each of which is incorporated herein by reference its entirety. Exemplary methods and systems of using fish to harvest algae for the production of fish lipids and/or biofuels are described in U.S. Provisional Application No. 61/483,316, filed May 6, 2011, and International Patent Publication Nos. WO 2010/036333 and WO 2010/141794, each of which is incorporated herein by reference its entirety.

Lipids obtained by the methods and systems provided herein can be subdivided according to polarity: neutral lipids and polar lipids. The major neutral lipids are triglycerides, and free saturated and unsaturated fatty acids. The major polar lipids are acyl lipids, such as glycolipids and phospholipids. A composition comprising lipids and hydrocarbons obtained by the methods and systems provided herein can be described and distinguished by the types and relative amounts of key fatty acids and/or hydrocarbons present in the composition.

Fatty acids are identified herein by a first number that indicates the number of carbon atoms, and a second number that is the number of double bonds, with the option of indicating the position of the first double bond or the double bonds in parenthesis. The carboxylic group is carbon atom 1 and the position of the double bond is specified by the lower numbered carbon atom. For example, linoleic acid can be identified by 18:2 (9, 12).

In certain embodiments, fatty acids produced by the cultured algae provided herein comprise one or more of the following: 12:0, 14:0, 14:1, 15:0, 16:0, 16:1, 16:2, 16:3, 16:4, 17:0, 18:0, 18:1, 18:2, 18:3, 18:4, 19:0, 20:0, 20:1, 20:2, 20:3, 20:4, 20:5, 22:0, 22:5, 22:6, and 28:1 and in particular, 18:1(9), 18:2(9,12), 18:3(6, 9, 12), 18:3(9, 12, 15), 18:4(6, 9, 12, 15), 18:5(3, 6, 9, 12, 15), 20:3(8, 11, 14), 20:4(5, 8, 11, 14), 20:5(5, 8, 11, 14, 17), 20:5(4, 7, 10, 13, 16), 20:5(7, 10, 13, 16, 19), 22:5(7, 10, 13, 16, 19), 22:6(4, 7, 10, 13, 16, 19). Without limitation, it is expected that many of these fatty acids are present in the lipids extracted from the fishes that ingested the cultured algae. Algae produce mostly even-numbered straight chain saturated fatty acids (e.g., 12:0, 14:0, 16:0, 18:0, 20:0 and 22:0) with smaller amounts of odd-numbered acids (e.g., 13:0, 15:0, 17:0, 19:0, and 21:0), and some branched chain (iso- and anteiso-) fatty acids. A great variety of unsaturated or polyunsaturated fatty acids are produced by algae, mostly with $C_{12}$ to $C_{22}$ carbon chains and 1 to 6 double bonds, mainly in cis configurations.

The hydrocarbons present in algae are mostly straight chain alkanes and alkenes, and may include paraffins and the like having up to 36 carbon atoms. The hydrocarbons are identified by the same system of naming carbon atoms and double bonds as described above for fatty acids. Non-limiting examples of the hydrocarbons are 8:0, 9,0, 10:0, 11:0, 12:0, 13:0, 14:0, 15:0, 15:1, 15:2, 17:0, 18:0, 19:0, 20:0, 21:0, 21:6, 23:0, 24:0, 27:0, 27:2(1, 18), 29:0, 29:2(1, 20), 31:2(1,22), 34:1, and 36:0.

In certain embodiments, a great variety of unsaturated or polyunsaturated fatty acids are produced by fish mostly with $C_{12}$ to $C_{22}$ carbon chains and 1 to 6 double bonds, mainly in cis configurations (Stansby, M. E., "Fish oils," The Avi Publishing Company, Westport, Conn., 1967). Fish oil comprises about 90% triglycerides, about 5-10% monoglycerides and diglycerides, and about 1-2% sterols, glyceryl ethers, hydrocarbons, and fatty alcohols. One of skill would understand that the amount and variety of lipids in fish oil varies from one fish species to another, and also with the season of the year, the algae diet, spawning state, and environmental conditions. Fatty acids produced by the fishes provided herein comprise, without limitation, one or more of the following: 12:0, 14:0, 14:1, 15:branched, 15:0, 16:0, 16:1, 16:2 n-7, 16:2 n-4, 16:3 n-4, 16:3 n-3, 16:4 n-4, 16:4 n-1, 17:branched, 17:0, 17:1, 18:branched, 18:0, 18:1, 18:2 n-9, 18:2 n-6, 18:2 n-4, 18:3 n-6, 18:3 n-6, 18:3 n-3, 18:4 n-3, 19:branched, 19:0, 19:1, 20:0, 20:1, 20:2 n-9, 20:2 n-6, 20:3 n-6, 20:3 n-3, 20:4 n-6, 20:4 n-3, 20:5 n-3, 21:0, 21:5 n-2, 22:0, 22:1 n-11, 22:2, 22:3 n-3, 22:4 n-3, 22:5 n-3, 22:6 n-3, 23:0, 24:0, 24:1 (where n is the first double bond counted from the methyl group). See, also Jean Guillaume, Sadisivam Kaushik, Pierre Bergot, and Robert Metailler, "Nutrition and Feeding of Fish and Crustaceans," Springer-Praxis, UK, 2001).

In certain embodiments, provided herein are methods of making a liquid fuel which comprise processing lipids derived from fish that harvested algae. Products provided herein made by the processing of fish-derived biofuel feedstocks can be incorporated or used in a variety of liquid fuels including but not limited to, diesel, biodiesel, kerosene, jet-fuel, gasoline, JP-1, JP-4, JP-5, JP-6, JP-7, JP-8, Jet Propellant Thermally Stable (JPTS), Fischer-Tropsch liquids, alcohol-based fuels including ethanol-containing transportation fuels, other biomass-based liquid fuels including cellulosic biomass-based transportation fuels.

In certain embodiments, triacylglycerides in fish oil can be converted to fatty acid methyl esters (FAME or biodiesel), for example, by using a base-catalyzed transesterification process (for an overview see, e.g., K. Shaine Tyson, Joseph Bozell, Robert Wallace, Eugene Petersen, and Luc Moens, "Biomass Oil Analysis: Research Needs and Recommendations, NREL/TP-510-34796, June 2004). The triacylglycerides are reacted with methanol in the presence of NaOH at 60° C. for 2 hrs to generate a fatty acid methyl ester (biodiesel) and glycerol.

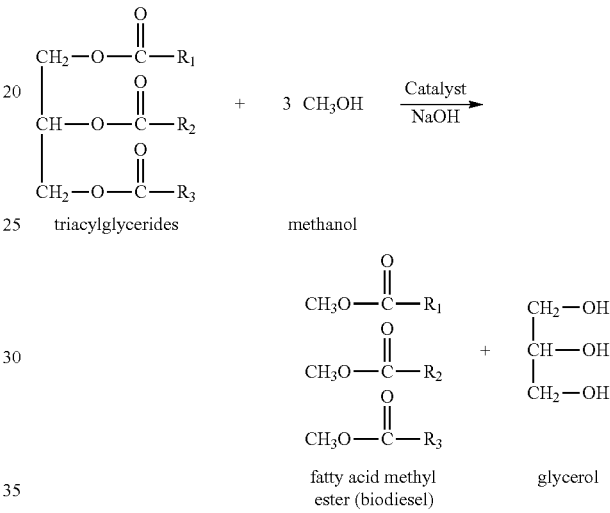

The biodiesel and glycerol co-products are immiscible and typically separated downstream through decanting or centrifugation, followed by washing and purification. Free fatty acids (FFAs) are a natural hydrolysis product of triglyceride and formed by the following reaction with triacylglycerides and water:

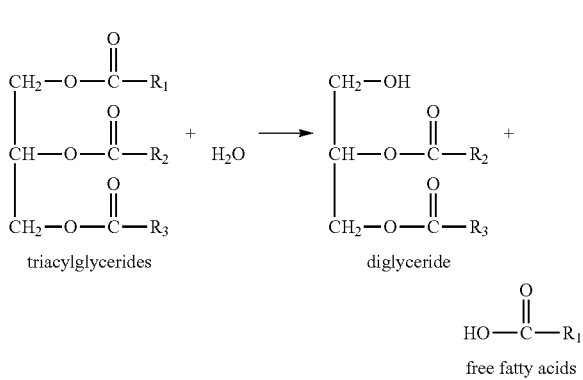

In certain embodiments, this side reaction is undesirable because free fatty acids convert to soap in the transesterification reaction, which then emulsifies the co-products, glycerol and biodiesel, into a single phase. Separation of this emulsion becomes extremely difficult and time-consuming without additional cost-prohibitive purification steps.

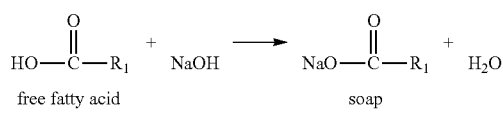

free fatty acid + NaOH → soap + H₂O

In certain embodiments, the methods provided herein can further comprise a step for quickly and substantially drying the fish oil by techniques known in the art to limit production of free fatty acids, preferably to less than 1%. In another embodiment, the methods provided herein can further comprise a step for converting or removing the free fatty acids by techniques known in the art.

In certain embodiments, triacylglycerides in fish oil can also be converted to fatty acid methyl esters (FAME or biodiesel) by acid-catalyzed transesterification, enzyme-catalyzed transesterification, or supercritical methanol transesterification. Supercritical methanol transesterification does not require a catalyst (Kusdiana, D. and Saka, S., "Effects of water on biodiesel fuel production by supercritical methanol treatment," Bioresource Technology 91 (2004), 289-295; Kusdiana, D. and Saka, S., "Kinetics of transesterification in rapeseed oil to biodiesel fuel as treated in supercritical methanol," Fuel 80 (2001), 693-698; Saka, S., and Kusdiana, D., "Biodiesel fuel from rapeseed oil as prepared in supercritical methanol," Fuel 80 (2001), 225-231). The reaction in supercritical methanol reduces the reaction time from 2 hrs to 5 minutes. In addition, the absence of the base catalyst NaOH greatly simplifies the downstream purification, reduces raw material cost, and eliminates the problem with soaps from free fatty acids. Rather than being a problem, the free fatty acids become valuable feedstocks that are converted to biodiesel in the supercritical methanol as follows.

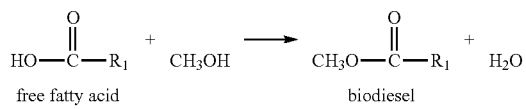

free fatty acid + CH₃OH → biodiesel + H₂O

Non-limiting exemplary reaction conditions for both the base-catalyzed and supercritical methanol methods are shown in Table 1 below. As will be apparent to one of ordinary skill in the art, other effective reaction conditions can be applied with routine experimentation to convert the triacylglycerides in fish oil to biodiesel by either one of these methods.

TABLE 1

Comparison between base-catalyzed and supercritical processing

|  | Traditional Method | SC Methanol |
|---|---|---|
| Reaction time | 2 hrs | <5 min |
| Conditions | Atmospheric, 60° C. | 1,000 psig, 350° C. |
| Catalyst | NaOH | None |
| FFA product | Soap | Biodiesel |
| Acceptable Water (%) | <1% | No Limit |

In another embodiment, triacylglycerides are reduced with hydrogen to produce paraffins, propane, carbon dioxide and water, a product generally known as green diesel. The paraffins can either be isomerized to produce diesel or blended directly with diesel. The primary advantages of hydrogenation over conventional base-catalyzed transesterification are two-fold. First, the hydrogenation process (also referred to as hydrocracking) is thermochemical and therefore much more robust to feed impurities as compared to biochemical processes, i.e., hydrocracking is relatively insensitive to free fatty acids and water. Free fatty acids are readily converted to paraffins, and water simply reduces the overall thermal efficiency of the process but does not significantly alter the chemistry. Second, the paraffin product is a pure hydrocarbon, and therefore indistinguishable from petroleum-based hydrocarbons. Unlike biodiesel which has a 15% lower energy content and can freeze in cold weather, green diesel has similar energy content and flow characteristics (e.g., viscosity) to petroleum-based diesel. In certain embodiments, the methods provided herein encompass the steps of hydrocracking and isomerization, which are well known in the art to produce liquid fuels, such as jet-fuel, diesel, kerosene, gasoline, JP-1, JP-4, JP-5, JP-6, JP-7, JP-8, and JPTS.

In yet another embodiment, residual fish biomass, such as fish meal, that remains after the extraction of lipids are used as a feedstock to produce biofuel. Residual fish biomass can be upgraded to bio-oil liquids, a multi-component mixture through fast pyrolysis (for an overview see, e.g., S. Czernik and A. V. Bridgwater, "Overview of Applications of Biomass Fast Pyrolysis Oil," Energy & Fuels 2004, 18, pp. 590-598; A. V. Bridgwater, "Biomass Fast Pyrolysis," Thermal Science 2004, 8(8), pp. 21-29); Oasmaa and S. Czernik, "Fuel Oil Quality of Biomass Pyrolysis Oils—State of the Art for End Users," Energy & Fuels, 1999, 13, 914-921; D. Chiaramonti, A. Oasmaa, and Y. Solantausta, "Power Generation Using Fast Pyrolysis Liquids from Biomass, Renewable and Sustainable Energy Reviews, August 2007, 11(6), pp. 1056-1086). According to certain embodiments provided herein, residual fish biomass is rapidly heated to a temperature of about 500° C., and thermally decomposed to 70-80% liquids and 20-30% char and gases. The liquids, pyrolysis oils, can be upgraded by hydroprocessing to make products, such as naphtha and olefins. Those skilled in the art will know many other suitable reaction conditions, or will be able to ascertain the same by use of routine experimentation.

In yet another embodiment, residual fish biomass can be subjected to gasification which partially oxidizes the biomass in air or oxygen to form a mixture of carbon monoxide and hydrogen or syngas. The syngas can be used for a variety of purposes, such as but not limited to, generation of electricity or heat by burning, Fischer-Tropsch synthesis, and manufacture of organic compounds. For an overview of syngas, see, e.g., Spath, P. L., and Dayton, D. C., "Preliminary Screening—Technical and Economic Assessment of Synthesis Gas to Fuels and Chemicals with Emphasis on the Potential for Biomass-derived Syngas." NREL/TP-510-34929, December 2003.

In yet another embodiment, residual fish biomass can be subjected to fermentation to convert carbohydrates to ethanol which can be separated using standard techniques. Numerous fungal and bacterial fermentation technologies are known in the art and can be used in accordance with certain embodiments provided herein. For an overview of fermentation, see, e.g., Edgard Gnansounou and Arnaud Dauriat, "Ethanol fuel from biomass: A Review," Journal of Scientific and Industrial Research, Vol. 64, November 2005, pp 809-821.

In certain embodiments, the processing step involves heating the fishes to greater than about 70° C., 80° C., 90° C. or 100° C., typically by a steam cooker, which coagulates the protein, ruptures the fat deposits and liberates lipids and oil and physico-chemically bound water, and; grinding, pureeing and/or pressing the fish by a continuous press with rotating helical screws. The fishes can be subjected to gentle pressure cooking and pressing which use significantly less energy than that is required to obtain lipids from algae. The coagulate may alternatively be centrifuged. This step removes a large fraction of the liquids (press liquor) from the mass, which comprises an oily phase and an aqueous fraction (stickwater). The separation of press liquor can be carried out by centrifugation after the liquor has been heated to 90° C. to 95° C. Separation of stickwater from oil can be carried out in vertical disc centrifuges. In certain embodiments, the lipids in the oily phase (fish oil) may be polished by treating with hot water, which extracts impurities from the lipids to form biofuel. To obtain fish meal, the separated water is evaporated to form a concentrate (fish solubles), which is combined with the solid residues, and then dried to solid form (presscake). The dried material may be grinded to a desired particle size. The fish meal typically comprises mostly proteins (up to 70%), ash, salt, carbohydrates, and oil (about 5-10%). The fish meal can be used as animal feed and/or as an alternative energy feedstock.

In another embodiment, the fish meal is subjected to a hydrothermal process that extract residual lipids, both neutral and polar. A large proportion of polar lipids, such as phospholipids, remain with the fish meal and lost as biofuel feedstock. Conversion of such polar lipids into fatty acids can boost the overall yield of biofuel from fish. The hydrothermal process provided herein generally comprises treating fish meal with near-critical or supercritical water under conditions that can extract polar lipids from the fish meal and/or hydrolyze polar lipids resulting in fatty acids. The fish meal need not be dried as the moisture in the fish meal can be used in the process. The process comprises applying pressure to the fish to a predefined pressure and heating the fish meal to a predefined temperature, wherein lipids in the fish meal are extracted and/or hydrolyzed to form fatty acids. The fish meal can be held at one or more of the preselected temperature(s) and preselected pressure(s) for an amount of time that facilitates, and preferably maximizes, hydrolysis and/or extraction of various types of lipids. The term "sub-critical" or "near-critical water" refers to water that is pressurized above atmospheric pressure at a temperature between the boiling temperature (100° C. at 1 atm) and critical temperature (374° C.) of water. The term "super-critical water" refers to water above its critical pressure (218 atm) at a temperature above the critical temperature (374° C.). In certain embodiments, the predefined pressure is between 5 atm and 500 atm. In certain embodiments, the predefined temperature is between 100° C. and 500° C. or between 325° C. and 425° C. The reaction time can range between 5 seconds and 60 minutes. For example, a fish meal can be exposed to a process condition comprising a temperature of about 300° C. at about 80 atm for about 10 minutes. The selection of an appropriate set of process conditions, i.e., combinations of temperature, pressure, and process time can be determined by assaying the quantity and quality of lipids and free fatty acids, e.g., neutral lipids, phospholipids and free fatty acids, that are produced. The process further comprise separating the treated fish meal into an organic phase which includes the lipids and/or fatty acids, an aqueous phase, and a solid phase; and collecting the organic phase as biofuel or feedstock.

In certain embodiments, the systems provided herein can comprise, independently and optionally, means for gathering fishes from which lipids are extracted (e.g., nets), means for conveying the gathered fishes from the fish enclosure or a holding enclosure to the fish processing facility (e.g., pipes, conveyors, bins, trucks), means for cutting large pieces of fish into small pieces before cooking and pressing (e.g., chopper, hogger), means for heating the fishes to about 70° C., 80° C., 90° C. or 100° C. (e.g., steam cooker); means for grinding, pureeing, and/or pressing the fishes to obtain lipids (e.g., single screw press, twin screw press, with capacity of about 1-20 tons per hour); means for separating lipids from the coagulate (e.g., decanters and/or centrifuges); means for separating the oily phase from the aqueous fraction (e.g., decanters and/or centrifuges); and means for polishing the lipids (e.g., reactor for transesterification or hydrogenation). Many commercially available systems for producing fish meal can be adapted for use in certain embodiments, including stationary and mobile systems that are mounted on a container frame or a flat rack. The fish oil or a composition comprising fish lipids, can be collected and used as a biofuel, or upgraded to biodiesel or other forms of energy feedstock. For example, biodiesel can be produced by transesterification of the fish lipids, and green diesel by hydrogenation, using technology well known to those of skill in the art.

In certain embodiments, the extracted fish lipids are not limited to use as biofuels. In one embodiment, the extracted fish lipids can be used to obtain omega 3 fatty acids, such as eicosahexaenoic acid (EPA) and/or docosahexaenoic acid (DHA) and/or derivatives thereof including, but not limited to esters, glycerides, phospholipids, sterols, and/or mixtures thereof. In one embodiment, the extracted fish lipids contain substantially purified EPA and/or DHA ranging from 1 to 50%, depending on the fish species, age, location, and a host of ecological and environmental factors. If higher EPA and/or DHA concentrations are desired, several established methods could be employed, including chromatography, fractional or molecular distillation, enzymatic splitting, low-temperature crystallization, supercritical fluid extraction, or urea complexation. These methods can further concentrate the EPA and/or DHA to nearly pure EPA and/or DHA.

In certain embodiments, EPA- and/or DHA-containing lipids may be separated and concentrated by short-path distillation, or molecular distillation. The lipids are first transesterified, either acid- or base-catalyzed, with ethanol to produce a mixture of fatty acid ethyl esters (FAEE). The FAEE are then fractionated in the short-path distillation to remove the short chain FAEE, C-14 to C-18. The concentrate of FAEE from C-20 to C-22 is where the EPA and/or DHA can be found. A second distillation of the concentrate can result in a final Omega-3 content of up to 70%. The concentration of the EPA and/or DHA in the final product will depend on the initial lipid profile of the fish oil. The FAEE can be used as a consumer product at this stage (fish oil capsules). In some countries, the FAEE are required to be reconverted to triglycerides through a glycerolysis reaction before they can be sold as a consumer product. In order to obtain pure EPA and/or DHA, an additional purification step is required using chromatography, enzymatic transesterification, ammonia complexation, or supercritical fluid extraction.

In certain embodiments, the methods and systems provide an EPA and/or DHA feedstock or an EPA and/or DHA comprising lipids, hydrocarbons, or both, derived from fish that harvested algae according to the methods provided herein. Lipids of the present embodiments can be subdivided according to polarity: neutral lipids and polar lipids. The major neutral lipids are triglycerides, and free saturated and unsaturated fatty acids. The major polar lipids are acyl lipids, such as glycolipids and phospholipids. A composition comprising lipids and hydrocarbons of the present embodiments can be described and distinguished by the types and relative amounts of key fatty acids and/or hydrocarbons present in the composition.

Fatty acids are identified herein by a first number that indicates the number of carbon atoms, and a second number that is the number of double bonds, with the option of indicating the position of the first double bond or the double bonds in parenthesis. The carboxylic group is carbon atom 1 and the position of the double bond is specified by the lower numbered carbon atom. For example, EPA is identified as 20:5 (n-3), which is all-cis-5,8,11,14,17-eicosapentaenoic acid, and DHA is identified as 22:6 (n-3), which is all-cis-4,7,10,13,16,19-docosahexaenoic acid, or DHA. The n-3 designates the location of the double bond, counting from the end carbon (highest number).

In certain embodiments, EPA and/or DHA in the predominant form of triglyceride esters can be converted to lower alkyl esters, such as methyl, ethyl, or propyl esters, by known methods and used in an esterification with a sterol to form esters, which can be further purified for use as nutritional supplement. Transesterification, in general, is well known in the art. See, e.g., W. W. Christie, "Preparation of Ester Derivatives of Fatty Acids for Chromatographic Analysis," Advances in Lipid Methodology—Volume Two, Ch. 2, pp. 70-82 (W. W. Christie, ed., The Oily Press, Dundee, United Kingdom, 1993).

In certain embodiments, to obtain a refined product with higher concentrations of EPA and/or DHA, certain lipases can be used to selectively transesterify the ester moieties of EPA and/or DHA in fish oil triglycerides, under substantially anhydrous reaction conditions, as described in U.S. Pat. No. 5,945,318.

In certain embodiments, one or more edible additives can be included for consumption with the nutritional supplement of containing EPA and/or DHA. In one embodiment, additives can include one or more antioxidants, such as, vitamin C, vitamin E or rosemary extract. In one embodiment, additives can include one or more suitable dispersant, such as, lecithin, an alkyl polyglycoside, polysorbate 80 or sodium lauryl sulfate. In one embodiment, additives can include a suitable antimicrobial is, for example, sodium sulfite or sodium benzoate. In one embodiment, additives can include one or more suitable solubilizing agent is, such as, a vegetable oil such as sunflower oil, coconut oil, and the like, or mono-, di- or tri-glycerides.

In certain embodiments, additives can include, but not limited to, vitamins such as vitamin A (retinol, retinyl palmitate or retinol acetate), vitamin B1 (thiamin, thiamin hydrochloride or thiamin mononitrate), vitamin B2 (riboflavin), vitamin B3 (niacin, nicotinic acid or niacinamide), vitamin B5 (pantothenic acid, calcium pantothenate, d-panthenol or d-calcium pantothenate), vitamin B6 (pyridoxine, pyridoxal, pyridoxamine or pyridoxine hydrochloride), vitamin B 12 (cobalamin or cyanocobalamin), folic acid, folate, folacin, vitamin H (biotin), vitamin C (ascorbic acid, sodium ascorbate, calcium ascorbate or ascorbyl palmitate), vitamin D (cholecalciferol, calciferol or ergocalciferol), vitamin E (d-alpha-tocopherol, or d-alpha tocopheryl acetate) or vitamin K (phylloquinone or phytonadione).

In certain embodiments, additives can include, but not limited to, minerals such as boron (sodium tetraborate decahydrate), calcium (calcium carbonate, calcium caseinate, calcium citrate, calcium gluconate, calcium lactate, calcium phosphate, dibasic calcium phosphate or tribasic calcium phosphate), chromium (GTF chromium from yeast, chromium acetate, chromium chloride, chromium trichloride and chromium picolinate) copper (copper gluconate or copper sulfate), fluorine (fluoride and calcium fluoride), iodine (potassium iodide), iron (ferrous fumarate, ferrous gluconate gluconate, magnesium hydroxide or magnesium oxide), manganese (manganese gluconate and manganese sulfate), molybdenum (sodium molybdate), phosphorus (dibasic calcium phosphate, sodium phosphate), potassium (potassium aspartate, potassium citrate, potassium chloride or potassium gluconate), selenium (sodium selenite or selenium from yeast), silicon (sodium metasilicate), sodium (sodium chloride), strontium, vanadium (vanadium surface) and zinc (zinc acetate, zinc citrate, zinc gluconate or zinc sulfate).

In certain embodiments, additives can include, but not limited to, amino acids, peptides, and related molecules such as alanine, arginine, asparagine, aspartic acid, carnitine, citrulline, cysteine, cystine, dimethylglycine, gamma-aminobutyric acid, glutamic acid, glutamine, glutathione, glycine, histidine, isoleucine, leucine, lysine, methionine, ornithine, phenylalanine, proline, serine, taurine, threonine, tryptophan, tyrosine and valine.

In certain embodiments, additives can include animal extracts such as cod liver oil, marine lipids, shark cartilage, oyster shell, bee pollen and d-glucosamine sulfate. In certain embodiments, additives can include, but not limited to, unsaturated free fatty acids such as .gamma.-linoleic, arachidonic and .alpha.-linolenic acid, which may be in an ester (e.g., ethyl ester or triglyceride) form.

In certain embodiments, additives can include, but not limited to, herbs and plant extracts such as kelp, pectin, Spirulina, fiber, lecithin, wheat germ oil, safflower seed oil, flax seed, evening primrose, borage oil, blackcurrant, pumpkin seed oil, grape extract, grape seed extract, bark extract, pine bark extract, French maritime pine bark extract, muira puama extract, fennel seed extract, dong quai extract, chaste tree berry extract, alfalfa, saw palmetto berry extract, green tea extracts, angelica, catnip, cayenne, comfrey, garlic, ginger, ginseng, goldenseal, juniper berries, licorice, olive oil, parsley, peppermint, rosemary extract, valerian, white willow, yellow dock and yerba mate.

In certain embodiments, additives can include, but not limited to, enzymes such as amylase, protease, lipase and papain as well as miscellaneous substances such as menaquinone, choline (choline bitartrate), inositol, carotenoids (beta-carotene, alpha-carotene, zeaxanthin, cryptoxanthin or lutein), para-aminobenzoic acid, betaine HCl, free omega-3 fatty acids and their esters, thiotic acid (alpha-lipoic acid), 1,2-dithiolane-3-pentanoic acid, 1,2-dithiolane-3-valeric acid, alkyl polyglycosides, polysorbate 80, sodium lauryl sulfate, flavanoids, flavanones, flavones, flavonols, isoflavones, proanthocyanidins, oligomeric proanthocyanidins, vitamin A aldehyde, a mixture of the components of vitamin $A_2$, the D Vitamins ($D_1$, $D_2$, $D_3$ and $D_4$) which can be treated as a mixture, ascorbyl palmitate and vitamin $K_2$.

In certain embodiments, fish meal can be produced from treating fish bodies with a protease acting at a relatively low temperature. In certain embodiments, proteases that can be used include proteinases such as acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatopeptidase and rennin; peptidases such as aminopeptidases, for example, arginine aminopeptidase, oxytocinase and leucine aminopeptidase; angiotensinase, angiotensin converting enzyme, insulinase, carboxypeptidase, for example, arginine carboxypeptidase, kininase 1 and thyroid peptidase, dipeptidases, for example, carnosinase and prolinase and pronases; as well as other proteases, denatured products thereof and compositions thereof.

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. The specific embodiments described herein are offered by way of example only, and the invention is to be limited only by the terms of the appended claims along with the full scope of equivalents to which such claims are entitled.

What is claimed:

1. A controlled method for producing biofuel and lipids from algae, said method comprising:
   (i) providing upwelled water in a body of water by using an open-cycle ocean thermal energy conversion (OTEC) system;
   (ii) culturing algae in the upwelled water;
   (iii) feeding the algae to adult planktivorous fish, wherein the algae are suitable as food for the adult planktivorous fish;
   (iv) extracting lipids from the adult planktivorous fish; and
   (v) polishing the lipids to make biofuel or other useful products; and wherein the open cycle OTEC system comprises a cold water pipe that is varied by depth and horizontal position to access a particular nutrient profile comprising a plurality of nutrients for the algae.

2. The method of claim 1, wherein size of the algae matches the filter-feeding ability of the planktivorous fish.

3. The method of claim 2, wherein the extracted fish lipids are polished to make biofuel.

4. The method of claim 3, wherein the biofuel is used in a liquid fuel selected from the group consisting of diesel, biodiesel, kerosene, jet-fuel, gasoline, JP-1, JP-4, JP-5, JP-6, JP-7, JP-8, Jet Propellant Thermally Stable (JPTS), a Fischer-Tropsch liquid, an alcohol-based fuel, and a cellulosic biomass-based transportation fuel.

5. The method of claim 2, wherein the extracted fish lipids are polished to make omega 3 fatty acids.

6. The method of claim 5, wherein the omega 3 fatty acids are selected from the group consisting of eicosahexaenoic acid (EPA), docosahexaenoic acid (DHA), and derivatives thereof.

7. The method of claim 1, wherein the body of water is a target site.

8. The method of claim 7, whereto the target site is selected to provide an upwelling of a nutrient-rich source of water.

9. The method of claim 8, wherein the method further comprises providing micronutrients to the target site.

10. The method of claim 9, wherein the micronutrients are inorganic salts selected from the group consisting of Si, Fe, Ca, Zn, Mn, B, Mo, Mg, V, Sr, Al, Rb, Li, Cu, Co, Br, I and Se.

11. The method of claim 9, wherein the micronutrients are provided to prevent or overcome nutrient limitation at the target site.

12. The method of claim 9, wherein the micronutrients are provided to control the growth of a population of algae at the target site.

13. The method of claim 1, wherein the nutrient-rich source of water provides a limiting nutrient.

14. The method of claim 13, wherein the limiting nutrient is selected from the group consisting of C, N, P, K, Si and Fe.

15. The method of claim 1, wherein the method further comprises providing one or more species of algae to the target site.

16. A controlled system for producing biofuel and lipids from algae, said system comprising:
   (i) means for generating or controlling upwelled water in a body of water;
   (ii) means for monitoring the environment of the upwelled water including a nuetirent profile comprising a plurality of nutrients;
   (iii) means for culturing algae in the upwelled water;
   (iv) means for feeding the algae to planktivorous fish, wherein the algae are suitable as food for the planktivorous fish;
   (v) means for extracting lipids from the planktivorous fish; and
   (vi) means for polishing the lipids to form biofuel or other useful products; and wherein the means for generating or controlling comprises a cold water pipe that is configured to be varied by depth and horizontal position to access the nutrient profile.

17. The system of claim 16, wherein the means for generating or controlling the upwelled water in the body of water comprises an open-cycle ocean thermal energy conversion (OTEC) system.

18. The system of claim 16, wherein the size of the algae matches the filter-feeding ability of the planktivorous fish.

19. The system of claim 18, wherein the system further comprises one or more enclosures containing the fish.

20. The system of claim 19, further comprising the means to monitor the environment of the one or more enclosures.

21. The system of claim 20 wherein the means to monitor the environment of the one or more enclosures is selected from the group consisting of means to monitor and/or adjust the pH, salinity, dissolved oxygen, temperature, turbidity, and concentrations of nutrients at the enclosures.

22. The system of claim 16, wherein the body of water is a target site.

23. The system of claim 22 or 19, wherein the system further comprises means to regulate the environment of the target site and/or the enclosures.

24. The system of claim 23, wherein the means to regulate the environment of a target site and/or the enclosures is selected from the group consisting of means to monitor and/or adjust the pH, salinity, dissolved oxygen, temperature, turbidity, and concentrations of nutrients to the target site and/or the enclosures.

25. The system of claim 22 further comprising means for directing nutrient-rich water towards the target site.

26. The system of claim 16, wherein the means to monitor the environment of a target site is selected from the group consisting of means to monitor the pH, salinity, dissolved oxygen, temperature, turbidity, and concentrations of nutrients at the target site.

27. The system of claim 16 wherein the cold water pipe pumps cold water from a depth of at least 3000 feet.

28. The system of claim 16 wherein the planktivorous fish are adult planktivorous fish.

* * * * *